(12) United States Patent
Ide et al.

(10) Patent No.: US 10,733,813 B2
(45) Date of Patent: Aug. 4, 2020

(54) MANAGING ANOMALY DETECTION MODELS FOR FLEETS OF INDUSTRIAL EQUIPMENT

(71) Applicant: International Business Machines Corporation, Armonk, NY (US)

(72) Inventors: Tsuyoshi Ide, Harrison, NY (US); Dzung Phan, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/801,017

(22) Filed: Nov. 1, 2017

(65) Prior Publication Data
US 2019/0130659 A1 May 2, 2019

(51) Int. Cl.
*G07C 5/00* (2006.01)
*G06N 7/00* (2006.01)
(Continued)

(52) U.S. Cl.
CPC .............. *G07C 5/006* (2013.01); *G06N 7/005* (2013.01); *G06N 20/00* (2019.01); *G06Q 10/1093* (2013.01); *G07C 5/008* (2013.01)

(58) Field of Classification Search
CPC ........ G07C 5/006; G07C 5/008; G06N 20/00; G06N 7/005; G06Q 10/1093
See application file for complete search history.

(56) References Cited

U.S. PATENT DOCUMENTS 8,887,286 B2   11/2014   Dupont et al.
8,959,065 B2   2/2015   Gorinevsky
(Continued)

OTHER PUBLICATIONS

Bahadori et al., "Learning with Minimum Supervision: A General Framework for Transductive Transfer Learning", 2011 11th IEEE International Conference on Data Mining, Dec. 11-14, 2011, pp. 61-70.

(Continued)

*Primary Examiner* — Nga X Nguyen
(74) *Attorney, Agent, or Firm* — Scully, Scott, Murphy & Presser, P.C.; Daniel Morris, Esq.

(57) ABSTRACT

A system and method for maintaining health of a fleet of assets implementing an asset maintenance framework for collective anomaly detection that provides for a more accurate maintenance planning solution for the fleet or assets that may be prioritized. Based on a Bayesian multi-task multi-modal sparse mixture of sparse Gaussian graphical models (MTL-MM GGM), the methods combine the variational Bayes framework with (1) Laplace prior-based sparse structure learning and (2) an $\ell_0$-based sparse mixture weight selection approach. Dual sparsity is guaranteed over both variable-variable dependency and mixture components to efficiently learn multi-modal distributions that are observed in various applications. A generated model represents the fleet-level CbM model as a combination between two model components: 1) S sets of sparse mixture weights representing individuality of the assets in the fleet; and 2) One set of sparse GGMs that are shared with the S assets to represent commonality across the S assets.

19 Claims, 13 Drawing Sheets

(51) Int. Cl.
G06N 99/00 (2019.01)
G06Q 10/10 (2012.01)
G06N 20/00 (2019.01)

(56) References Cited

U.S. PATENT DOCUMENTS

| | | | |
|---|---|---|---|
| 9,625,354 | B2 | 4/2017 | Ide et al. |
| 2004/0243636 | A1 | 12/2004 | Hasiewicz et al. |
| 2014/0188778 | A1 | 7/2014 | Garvey et al. |
| 2016/0078695 | A1* | 3/2016 | McClintic ............. G06Q 10/06 701/29.4 |
| 2017/0161963 | A1 | 6/2017 | Green et al. |
| 2017/0364818 | A1* | 12/2017 | Wu .................. G06N 7/005 |
| 2019/0038148 | A1* | 2/2019 | Valys ................. A61B 5/7264 |

OTHER PUBLICATIONS

Banerjee et al., "Convex Optimization Techniques for Fitting Sparse Gaussian Graphical Models", Proceedings of the 23rd International Conference on Machine Learning, Pittsburgh, PA, 2006, Jun. 25-29, 2006, pp. 89-96.
Bishop, "Pattern Recognition and Machine Learning", Book 2006, Springer-Verlag New York, Inc., Secaucus, NJ, USA, ISBN: 0387310738.
Caruana, "Multitask Learning", Machine Learning, Jul. 1997, vol. 28, Issue 1, pp. 41-75.
Chiquet et al., "Inferring multiple graphical structures", Statistics and Computing, 21(4):537-553, Received: Dec. 22, 2009, Accepted: May 31, 2010; Published online: Jun. 17, 2010.
Colonna et al., "An incremental technique for real-time bioacoustic signal segmentation", Expert Systems with Applications, 42(21): 7367-7374; May 28, 2015.
Corduneanu et al., "Variational Bayesian Model Selection for Mixture Distributions", Proceedings Eighth International Conference on Artificial Intelligence and Statistics, Morgan Kaufman, Jan. 1, 2001, pp. 27-34.
Danaher et al., "The joint graphical lasso for inverse covariance estimation across multiple classes", Journal of the Royal Statistical Society: Series B (Statistical Methodology), 76(2):373-397, Jul. 11, 2012.
Freidman et al., "Sparse inverse covariance estimation with the graphical lasso", Biostatistics, 9(3):432-441, Nov. 17, 2007.
Gao et al., "Estimation of multiple networks in Gaussian mixture models", Electronic Journal of Statistics, vol. 10, (2016), May 2, 2016 pp. 1133-1154, ISSN: 1935-7524, DOI: 10.1214/16-EJS1135.
Goldstein, "Multilevel Modeling of Survey Data", Journal of the Royal Statistical Society, Series D (The Statistician), 40(2):235-344, 1991.
Hara et al., "Learning a Common Substructure of Multiple Graphical Gaussian Models", Neural Networks, Sep. 26, 2012, 38:23-38.

He et al., "Hierarchical Multi-task Learning with Application to Wafer Quality Prediction", 2012 IEEE 12th International Conference on Data Mining, Dec. 10-13, 2012; Brussels, Belgium, pp. 290-298.
He et al., "Multi-task learning with one-class SVM", Neurocomputing 133 (2014); Received May 22, 2013; Received resived form Oct. 31, 2013; Accepted Dec. 5, 2013; Available online: Jan. 10, 2014; pp. 416-426.
Honorio et al., "Mult-Task Learning of Gaussian Graphical Models", Proceedings of the 27th International Conference on Machine Learning, Haifa, Israel, 2010, Jun. 21-24, 2010.
Idé et al., "Proximity-Based Anomaly Detection using Sparse Structure Learning", 2009 Siam International Conference on Data Mining, Apr. 30-May 2, 2009, Sparks, Nevada, pp. 97-108.
Mackay, "Information theory, inference and learning algorithms", ©Cambridge University Press 2003, Version 7.2 (fourth printing) Mar. 28, 2005.
Peterson et al., "Bayesian Inference of Mutliple Gaussian Graphical Models", Journal of the American Statistical Association, vol. 110, 2015—Issue 509, Feb. 18, 2014, Received May 1, 2013, Accepted author version posted online: Mar. 7, 2014, Published online: Mar. 7, 2014, pp. 159-174.
Phan et al., "Demystifying Automatic Relevance Determination in Probabilistic Mixture Models", 31st Conference on Neural Information Processing Systems (NOPS 2017), Long Beach, CA, Dec. 4, 2017-Dec. 9, 2017; pp. 1-10.
Tax et al., "Support Vector Data Description", Machine Learning, Jan. 2004, vol. 54, Issue 1, pp. 45-66.
Varoquaux et al., "Brain covariance selection: better individual functional connectivity models using population prior", Advances in Neural Information Processing Systems, Nov. 12, 2010, pp. 2334-2342.
Xiao et al., "A robust one-class transfer learning method with uncertain data", Knowl. Inf. Syst. Aug. 2015, vol. 44, Issue 2, pp. 407-438.
Yamanishi et al., "On-line Unsupervised Outlier Detection Using Finite Mixtures with Discounting Learning Algorithms", The material in this paper was presented in part at the Sixth ACM SIGKDD International Conference on Knowledge Discovery and Data Mining [25], Aug. 20-23, 2000, Boston, MA, Oct. 2001.
Yu et al., "Anomaly detection algorithm based on Gaussian process model", Computer Engineerings and Design, 37.4 (Apr. 16, 2016); 914-20, 953, English Abstract.
Zhang et al., "Spare Inverse Covariance Matrices for Low Resource Speech Recognition", IEEE Transactions on Audio, Speech, and Language Processing, vol. 21, No. 3, Mar. 2013.
Zhu et al., "Co-Clustering Structural Temporal Data with Applications to Semiconductor Manufacturing", ACM Transactions on Knowledge Discovery from Data, vol. 10, No. 4, Article 43, May 2016, pp. 43:1-43-18.

* cited by examiner

Algorithm 1 Multi-task multi-modal GGM
procedure MTL-MM($D, \lambda_0, m^0, \rho, \epsilon, \tau$)
    Initialize $\{(m^k, \Lambda^k)\}$
    Set $\pi_k^s = \frac{1}{K}$, $\lambda_k = \lambda_0 + \frac{N}{K}$ for all $k, s$
    repeat
        for $s \leftarrow 1, S$ do
            for $n \leftarrow 1, N^s$ do
                for $k \leftarrow 1, K$ do
                      $r_k^{s(n)} \leftarrow$ Eq. (15)
                end for
                $r_k^{s(n)} \leftarrow r_k^{s(n)} / \sum_{l=1}^{K} r_l^{s(n)}$
            end for
        end for
        for $k \leftarrow 1, K$ do
            for $s \leftarrow 1, S$ do
                $\pi_k^s \leftarrow$ Eq. (28)
            end for
            $N_k \leftarrow \sum_{s=1}^{S} \sum_{n=1}^{N^s} r_k^{s(n)}$
            $\lambda_k = \lambda_0 + N_K$
            $m^k \leftarrow$ Eq. (20)
            $\bar{\Lambda}^k \leftarrow$ Eq. (21)
        end for
    until convergence
    return $\{\pi^s\}$ and $\{\mu^k, \Lambda^k, \lambda_k\}$
end procedure — 745

MANAGING ANOMALY DETECTION MODELS FOR FLEETS OF INDUSTRIAL EQUIPMENT

BACKGROUND

Field

The present disclosure relates generally to a method and system for monitoring a health of a fleet of industrial equipment and for providing maintenance care to industrial equipment.

Description of the Related Art

Keeping good operational conditions of industrial equipment is a major business interest across many industries. Although detecting indications of system malfunctions from noisy sensor data is sometimes challenging even to seasoned engineers, statistical machine learning has a lot of potential to automatically capture major patterns of normal operating conditions for condition-based monitoring (CbM).

In a typical setting, physical sensor data from multiple sensors is taken as the input, and anomaly scores, numerical values representing the degree of anomalousness of the operational state, are computed. Human administrators may then decide to take actions to mitigate the risk of e.g., service interruptions.

SUMMARY

A "healthcare" monitoring system and method for optimally scheduling and providing care and maintenance for a fleet of assets such as vehicles, industrial equipment, etc.

The monitoring system is configured to monitor a collection of many assets, including assets that are similar but not identical, as they may operate subject to different baseline conditions. The system and methods provide for a more comprehensive monitoring that leverages the commonality of those assets while paying attention to the individuality of each.

The systems and methods implement techniques for multi-task learning of Gaussian graphical models (GGMs).

The systems and methods further implement techniques for handling multi-modalities and generate a practical framework for collective CbM.

In one aspect, there is provided a method for anomaly detection when collectively monitoring a fleet of assets. The method comprises: receiving, using the one or more hardware processors, multivariate time-series data from plural sensors associated with each asset of a fleet of assets, the data representing multiple operational states associated with similar assets at a present time window; determining, using one or more the hardware processors, current parameter values of a learned mixture model based on the received present time window data, the mixture model capturing both a dependency structure of the similar assets of the fleet and data representing an individual asset's mixture model weight signature; computing, using the one or more hardware processors, an anomalous condition value based on the determined parameter values; comparing, using the one or more hardware processors, the anomalous condition value against a threshold value; responsive to the comparison, using the one or more hardware processors to detect an anomalous condition with respect to one or more assets; and automatically generating, using the one or more hardware processors, a notification of the detected anomalous condition for communication to a user via an interface device.

In a further embodiment, there is disclosed a system for collectively monitoring a fleet of assets. The system comprises: a hardware processor and a non-transitory computer-readable memory coupled to the processor, wherein the memory comprises instructions which, when executed by the processor, cause the processor to: receive multivariate time-series data from plural sensors associated with each asset of a fleet of assets, the data representing multiple operational states associated with similar assets at a present time window; determine current parameter values of a learned mixture model based on the received present time window data, the mixture model capturing both a dependency structure of the similar assets of the fleet and data representing an individual asset's mixture model weight signature; compute an anomalous condition value based on the determined parameter values; compare the anomalous condition value against a threshold value; responsive to the comparison, detect an anomalous condition with respect to one or more assets; and automatically generate a notification of the detected anomalous condition for communication to a user via an interface device.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

FIG. 7 shows a detailed MTL-MM GGM algorithm 700 used for solving the convex mixed integer programming (MIP) problem for automatically learning the anomaly detection model for an asset (system) in a non-limiting embodiment;

DETAILED DESCRIPTION

Figure 1:
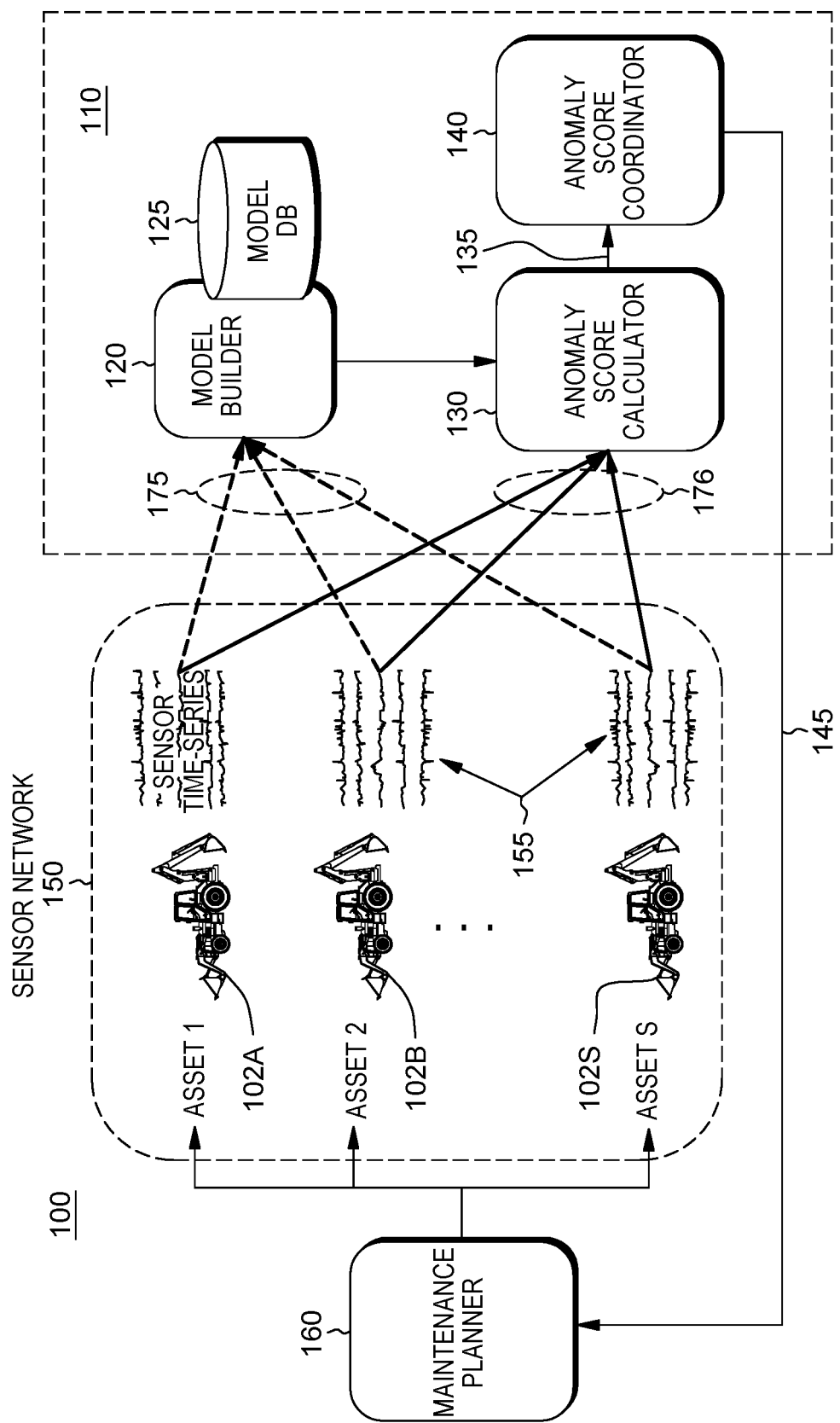
FIG. 1 is a diagram depicting a system for collective, on-line condition-based monitoring of a fleet of assets such as industrial equipment or vehicles in one embodiment.

There is disclosed a "healthcare" monitoring system and method to provide care and collective maintenance for a fleet of assets for an entity, e.g., a manufacturer, a fleet owner, a business or like entity. The monitoring system is configured to monitor a collection of many assets, including assets that are similar but not identical. The system provides a more comprehensive monitoring that leverages the commonality of those assets while paying attention to the individuality of each so as to provide for a more accurate maintenance planning solution for a fleet or assets that may be prioritized.

In one aspect, the system and methods herein assist an entity that manages under its control hundreds of similar types of tools or "assets" (e.g., industrial machinery, equipment, vehicles, electric vehicles, semiconductor manufacturing tools, mining machines, wind turbines, pumps, cement grinding mills, etc.) under different operating conditions. The systems and methods herein monitor and provide maintenance care across all assets in an integrated CbM platform all over the world.

The system and methods herein assist an entity that is building a fault detection model for thousands of vehicles, e.g., located in certain areas. Since the occurrence of vehicle malfunction is quite rare, the systems and methods combine information from individual vehicles to get some common insights. On the other hand, since driving conditions can be significantly different for each driver, the models employed are customized to individual vehicles.

In one embodiment, systems and methods provide a solution for anomaly detection when collectively monitoring a fleet of assets that can capture multiple operational, states manage many similar but different assets and provide insights into the internal relationship of the variables captured.

The systems and methods implement techniques for multi-task learning of Gaussian graphical models (GGMs). Given sparsity-enforcing regularization techniques, GGMs are employed in anomaly detection from the viewpoint of interpretability and robustness to the noise.

To learn GGMs in the multi-task setting, there are three methods known to date: group-lasso-based (G. Varoquaux, A. Gramfort, J.-B. Poline, and B. Thirion, "Brain covariance selection: better individual functional connectivity models using population prior," in Advances in Neural Information Processing Systems, 2010, pp. 2334-2342; J. Honorio and D. Samaras, "Multi-task learning of gaussian graphical models," in Proceedings of the 27th International Conference on Machine Learning, 2010, pp. 447-454; J. Chiquet, Y. Grandvalet, and C. Ambroise, "Inferring multiple graphical structures," Statistics and Computing, vol. 21, no. 4, pp. 537-553, 2011), fused-lasso-based (P. Danaher, P. Wang, and D. M. Witten, "The joint graphical lasso for inverse covariance estimation across multiple classes," Journal of the Royal Statistical Society: Series B (Statistical Methodology), vol. 76, no. 2, pp. 373-397, 2014; C. Gao, Y. Zhu, X. Shen, W. Pan et al., "Estimation of multiple networks in gaussian mixture models," Electronic Journal of Statistics, vol. 10, no. 1, pp. 1133-1154, 2016), and Bayesian methods (C. Peterson, F. C. Stingo, and M. Vannucci, "Bayesian inference of multiple gaussian graphical models," Journal of the American Statistical Association, vol. 110, no. 509, pp. 159-174, 2015). However, these existing studies aim at learning a single common graph across the tasks and thus are unable to handle multi-modal natures of the real world.

The systems and methods implement techniques for handling multi-modalities and generate a practical framework for collective CbM.

In one embodiment, the built model lets all the S tasks (or systems) share the K sparse GGMs as a "pattern dictionary." The individuality of each task is represented by the mixture weights over those K patterns. In one embodiment, the mixture weights and the K GGMs are learned from data based on a Bayesian formulation.

The systems and method include building a multi-task multi-modal GGM learning model including computer implemented techniques for deriving a variational Bayes algorithm having a guaranteed sparsity in both variable relationship and mixture weights. With respect to deriving a variational Bayes algorithm, there are employed methods implementing an $\ell_0$-regularized formulation for mixture weight determination. These techniques can then be used to provide an anomaly detection solution of a practical CbM framework for a fleet of assets.

FIG. 1 depicts a high-level view of a fleet-level condition-based monitoring system 100. At a high-level, one embodiment provides a sense-and-control system for a company's assets, e.g., a fleet of vehicles, e.g., $102_A$, $102_B$, . . . , $102_S$, hereinafter referred to as "systems" or "tasks". The system 100 is equipped with a sensor network 150 connecting individual sensors at each asset to a central control center (a computer system) which may receive/store the time series sensor data 155. Some sensor devices that may be employed to monitor assets may include, but are not limited to: Temperature sensors, Pressure sensors, Water quality sensors, Chemical/smoke and gas sensors, Level sensors, IR sensors, force/load/torque/strain sensors; motion/velocity/displacement/position sensors; and vibration and shock sensors, MEMS (micro-electro-mechanical systems sensors, optical/imaging sensors, electro-magnetic sensors. For a fleet of vehicles, types of sensor variables that may be monitored include, but are not limited to: engine RPM, acceleration, vehicle speed, etc. There may be multiple sensors in each asset providing sensor data.

Each asset $102_A$, $102_B$, . . . , $102_S$ may consist of many distinct parts, and individual parts may be monitored with multiple sensors. Since distinct parts in a system (asset) are not necessarily independent, multivariate signals 175, 176 from each sensor must be analyzed in a multivariate fashion. From the sensor network, the multivariate time-series data 175 associated with each individual asset are input to a computer system 110 providing a model build framework configured with a model builder module 120 configured to invoke instructions for building anomaly detection models for the assets, an anomaly score calculator module 130 configured to invoke instructions for computing one or more anomaly scores for assets that may indicate an anomalous/faulty operation, and an anomaly score coordinator module 140 configured to invoke instructions for processing computed anomaly scores for purposes of conducting and prioritizing asset maintenance.

In one embodiment, it is assumed that a fixed number of sensors is common across each of the assets. Let M be the number of sensors associated with each asset. A model database or like storage device 125 stores S anomaly detection models that have been provided by the model builder module 120, where S is the number of assets (systems or tasks) in the fleet. In one embodiment, the anomaly detection models learned are multi-task, multimodal Gaussian graphical models (MTL-MM GGM models).

Given the learned MTL-MM GGM models, during an "on-line" process, the Anomaly Score Calculator 130 receives the multivariate signals 176 and computes anomaly scores at predefined times, e.g., periodically, such as once every 15 minutes. For each asset, calculator module 130 produces an anomaly score for the entire system and for each of the M sensors.

Figure 2:
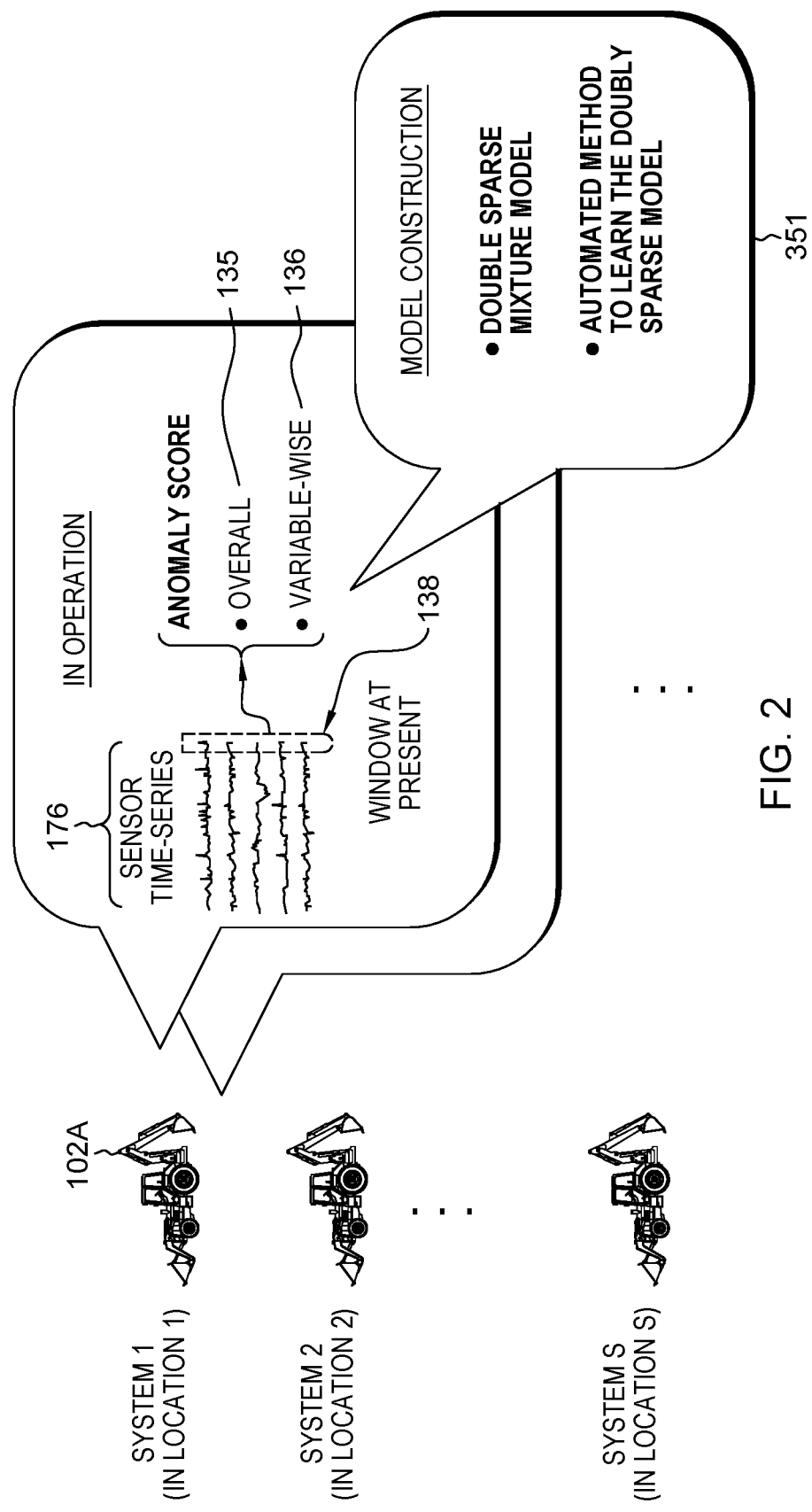
FIG. 2 is a diagram depicting processing of new (on-line) samples of multivariate sensor data from a system for computing an overall anomaly score for in addition to individual "per-variable" anomaly scores for each variable of the system.

In one embodiment, as shown in FIG. 2, the Anomaly Score Calculator module 130 receives current (on-line) samples 176 of recent multivariate sensor data from a system (e.g., asset 102A) and using the received data of a present time window 138, implements steps described below for generating an overall anomaly score 135 for the system. In addition, module 130 further processes the most recent multivariate data corresponding to recent time-series data from each of the M sensors of that system and generates individual "per-variable" anomaly scores 136 for each variable to indicate the dynamic behavior or "health" of that system. As will be described, the generating of the scores involves the automated solving (updating) of the MTL-MM GGM model which is a doubly sparse mixture model 351 associated with that system.

Anomaly Score Coordinator module 140, implements functions for ranking the overall and per-variable anomaly scores for each asset and compares each score against a set of thresholds provided by Model Builder 120. If some anomaly scores are greater than the thresholds, may indicate a possible malfunction with that asset and the system generates signals 145 indicating those asset(s) and corresponding score(s). In one embodiment, these signals may be automatically communicated to a Maintenance Planner module 160, at a same or external computing system, which runs instructions for scheduling and prioritizing maintenance actions.

In one embodiment, when an anomaly score for an asset is determined as exceeding a threshold, the output signal 145 indicates the overall anomaly score for the individual asset. There is further compared individual "per variable" anomaly scores determined for each sensor variable of that particular asset against determined threshold values for each of those corresponding sensor variables. The result of a per variable comparison exceeding a certain threshold will indicate a particular sensor corresponding to that variable or a component that may be operating in an anomalous way based on that variable score. The thresholds of overall and per-variable anomaly scores can be determined by computing the scores against a data set acquired under a normal condition. Specifically, the threshold can be determined as, e.g., the 95 percent quantile or more simply as the maximum value of the anomaly scores under the normal condition.

Thus, output signals 145 may further be generated to indicate the variable and/or sensor associated with a particular component that has most likely contributed to the potential failure for that asset. From the asset data represented in the signals 145, it can be determined what component of that asset may need immediate maintenance. Detailed steps to compute the anomaly scores at the Anomaly Score Calculator module 130 are described herein below.

Figure 3:
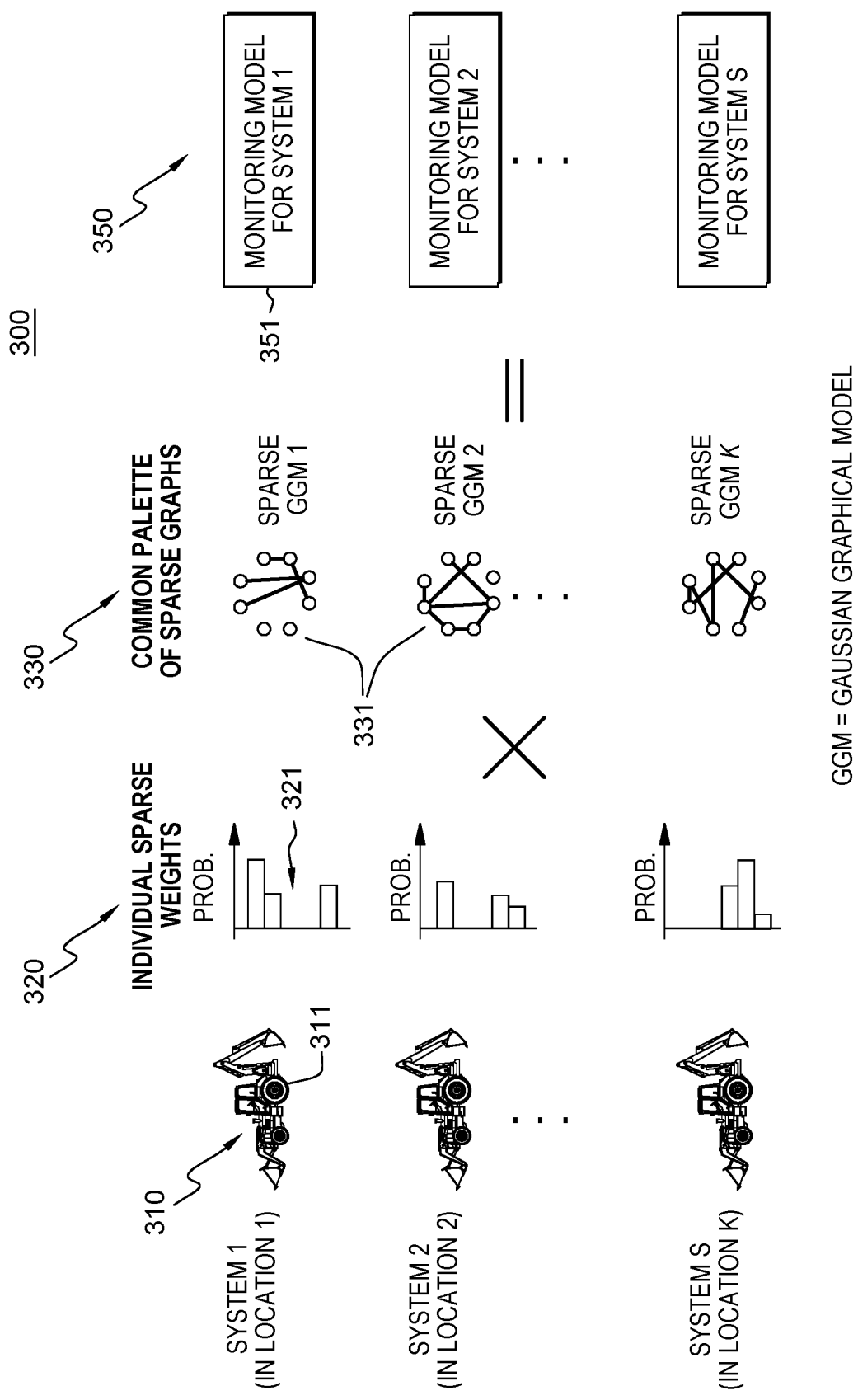
FIG. 3 visually depicts the building a fleet-level CbM model for each asset of an example fleet of assets in one embodiment.

A Model Builder procedure 300 is now visually depicted in reference to FIG. 3. FIG. 3 depicts the building a fleet-level CbM model 350 for each asset of an example fleet of assets 310 labeled as System 1, System 2, . . . , System S. The building of the fleet-level CbM model 350 includes computing a combination of two model components: 1) S sets of sparse mixture weights 320; and 2) One set of sparse GGMs 330. The former can be different from asset to asset, and thus represents individuality of the assets in the fleet. The latter 330 is shared with the S assets and thus represents commonality across the S assets. The individually sparse mixture weights 321 for an asset specify the importance of the GGMs 330. That is, computed weights function as a selector of the GGMs in the palette 330 and different systems 310 have different weights or signature weight distributions. These weights will have many zeros for robustness and interpretability and are automatically learned from data.

Figure 4:
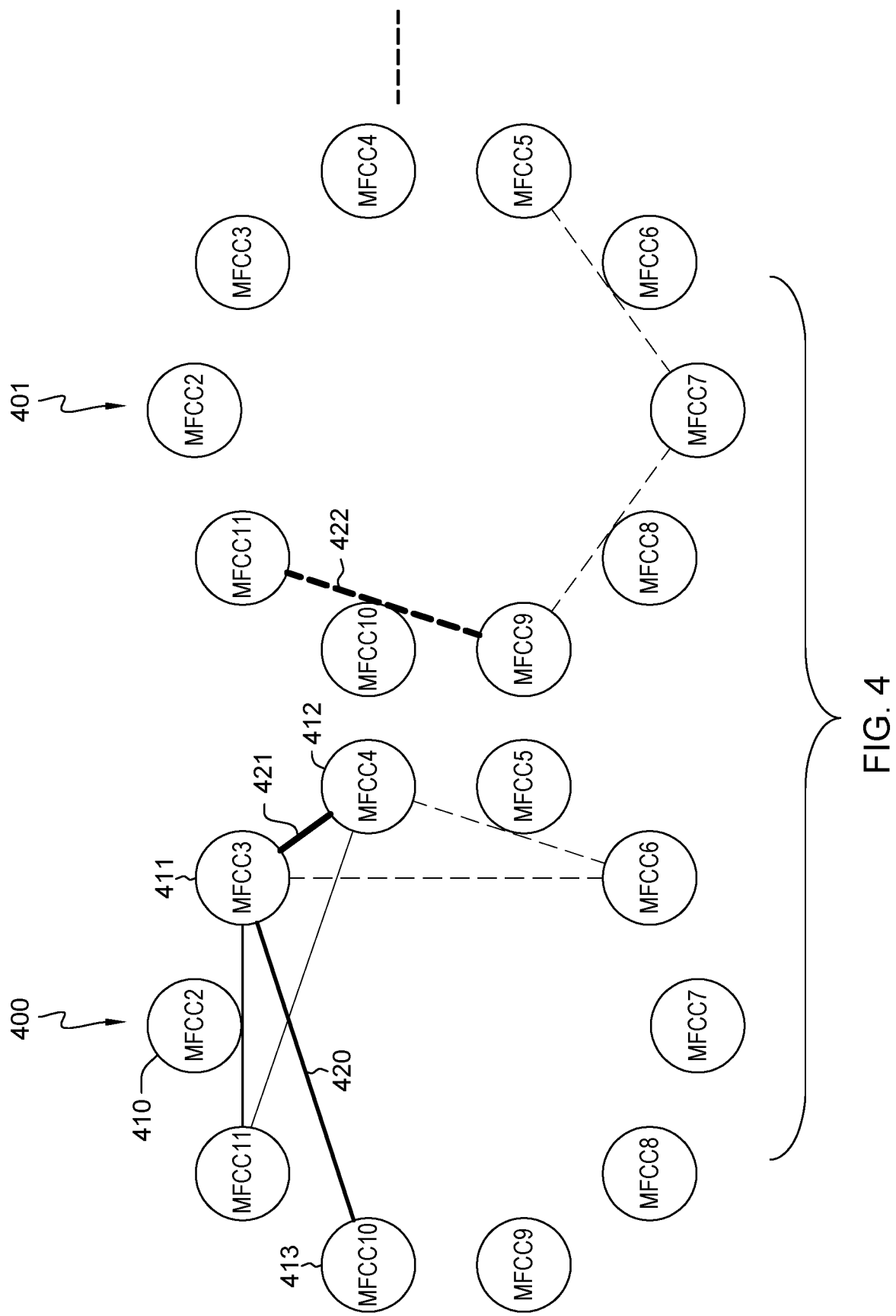
FIG. 4 shows example of sparse GGM graphs associated with an asset including nodes representing sensor variables and connecting lines representing variable dependencies.

FIG. 4 shows example of sparse GGM graphs 400, 401 associated with an individual asset including nodes 410 representing variables and their lines 420 representing variable dependencies. For example, nodes 410 may represents variables associated with a vehicle, e.g., acceleration at node 411, engine RPM at node 412, or vehicle speed at node 413, etc. There may be other variables temperature, pressures etc. In the example depicted, ten variables are shown for the GGMs 401, 402 for this vehicle asset. The lines 420 represent a positive (non-zero) dependency upon particular the variables, e.g., vehicle speed 413 may be dependent upon acceleration pedal 411, acceleration 411 may show dependency upon engine RPM 412. Other lines 422 in a GGM connecting variable nodes may represent negative (non-zero) values negatively-correlated dependency as shown in GGM graph 401. The graph further depicts the strength of the dependency as shown by the thickness of the lines 320. For example, acceleration variable 411 may show a stronger dependency upon engine RPM variable 412 as shown by thicker connecting line 421. The dependency information are correlation coefficients captured by the GGM model, and provides a summary capturing the normal state operation of the particular system. As shown, multiple GGM graphs 400, 401, etc. are needed to represent the dynamic behavior of the asset, e.g., vehicle behavior may differ between driving in the city vs. driving on the highway. For example, graph 400 may represent a single asset, e.g., a car or vehicle, behavior when run on city streets, and GGM graph 401 may represent the behavior of that single asset when run on a country highway. This dependency information is useful to understand variable insights for a single asset. These GGM patterns are commonly shared between each asset of the fleet however, different vehicles will have different mixture model weights assigned. For anomaly (deviation) detection, a current asset's situation is compared against this normal state of operation. The normal state of operations is a mixture of different dynamic conditions which is captured by the GGM graphs 400, 401, etc. This GGM graph modeling is a mixture model, and the present method provide an expedient and efficient way to learn the mixture model.

Thus, returning to FIG. 3, there is generated a set 330 of sparse GGMs, or a "common palette" of sparse GGMs that admit multiple sparse GGMs 331. By implementing this model build feature, the model 350 generated by the Model Builder will flexibly handle the multi-modality as required for fleet-level CbM. For the fleet-level CbM model 350, the Model Builder component generates/updates an individual learned anomaly detection model 351 for each corresponding asset 311.

To learn the mixture models, knowledge and experience from these variables, e.g., GGM pattern of other assets of the fleet, are used. Thus, a multi-task learning aspect of the method is implemented using data sets (the sparse GGM models) of other assets. Each asset in the fleet may be represented by common sparse GGM patterns, e.g., GGMs 331, 332, etc. in the same library or palette (pattern dictionary) of GGMs 330. However, for each asset, the sparse GGMs in the palette may be assigned a different mixture model weight, i.e., the mixture weights assigned to each individual GGM of the common library may be different for each asset. GGMS for individual assets may have different mixture model (correlation) coefficients assigned. For example, for a first vehicle, a mixture model numerical value weight may be 0.5 for GGM 400 and a weight of 0.5 may be assigned to a GGM 401 for that asset, while a second asset may assign mixture model weight of 0.1 for GGM 400 and a weight of 0.9 for GGM 401.

Thus, for each asset, FIG. 3 represents the Model Builder using mixture weight learning to optimally build a learned model 351 based on a representation combining a common collection 330 of sparse GGMs as a basis set and individual sparse mixture weights 321 providing a sparse solution 321 for the mixture weights, by which the number of sparse GGMs in the palette is automatically determined. Using a semi-closed form solution as described herein below with respect to equation (33) herein below, and a convex mixed-integer programming formulation, the model builder is fast, accurate (a global solution is provided) and simple in that it does not use any "hidden" parameters used to truncate least contributed weights.

Figure 5:
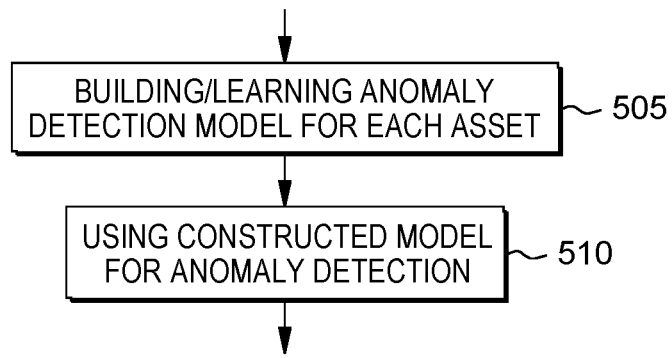
FIG. 5 depicts an overview of the health monitoring system for a fleet of industrial equipment that reduces model building and maintenance costs.

FIG. 5 depicts an overview of the health monitoring system 500 for a fleet of industrial equipment that reduces model building and maintenance costs including, at 505, the invoking of a learning phase (e.g., a model building/updating stage) by invoking the Model Builder component 120 to generate a multi-task sparse GGM mixture model. The model generated at 505 is a doubly sparse mixture model and automated methods described herein are employed to learn the doubly sparse model. Then, at 510, the constructed anomaly detection model is used for anomaly detection when current sensor data is received from the fleet and generating of anomaly scores which are processed to indicate anomalous systems/components.

Figure 6:
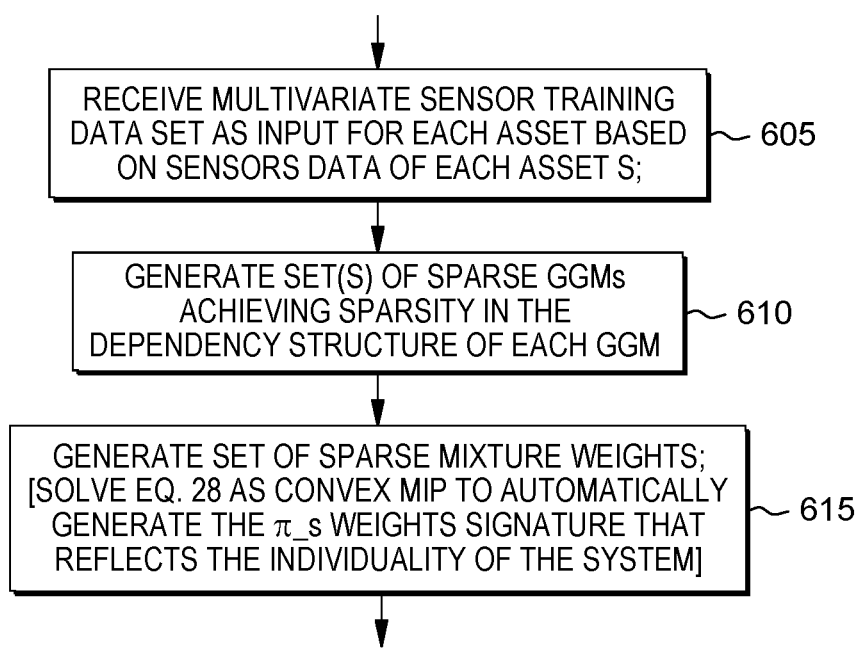
FIG. 6 depicts an overview of a method for storing and managing a fleet-level monitoring model in accordance with an embodiment.

FIG. 6 depicts a method 600 for storing and managing a fleet-level monitoring model based on a MTL-MM GGM representation combining a common collection of sparse GGMs as a basis set with individual sparse mixture weights as shown in FIG. 3.

As shown at a first step 605, the condition-based monitoring system 100 receives the data for the model building learning methods which may include multivariate sensor training data set as input for each asset based on sensors data for each asset "s". Then, continuing at 610, the method solves the MTL-MM GGM and generates for the fleet a collection or palette of sparse GGMs achieving sparsity in the dependency structure of each GGM. Sparsity of the GGM is automatically guaranteed by solving Eq. 21) below. Then, at 615, methods are implemented to generate the set of sparse mixture weights corresponding to that asset. The generated mixture model weights is a signature reflecting the individuality of the system and an individual sparse mixture weight solution is automatically generated by solving Eq. 28) below as a convex Mixed Integer Problem (MIP).

Figure 14:
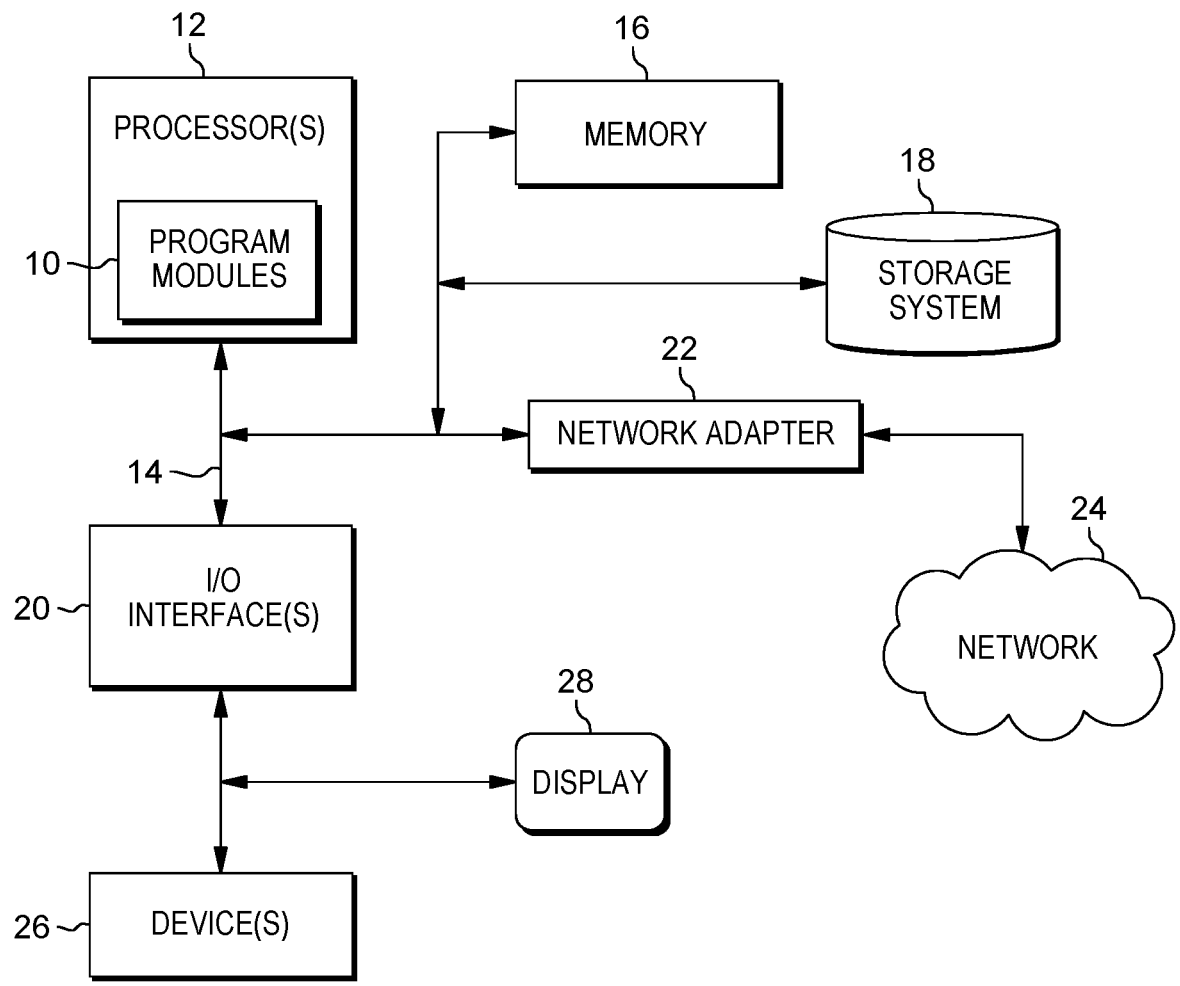
FIG. 14 illustrates an example computing system in accordance with an embodiment.

As an example of multi-task multi-modal models in a real application, there is considered a one-dimensional (1D) two-task example. For example, FIG. 14 depicts the monitoring of two vehicles (S=2 or two tasks) 202, 204 through a single variable (M=1), e.g., the temperature of a wheel axle of each vehicle. In FIG. 14, the top row is for Vehicle 1 202 (e.g., at a location 1) and the bottom row is for Vehicle 2 204 (e.g., at a location 2). The histograms in the same row are all the same, showing the empirical distribution (i.e. ground truth) of the temperature. Since driving conditions are different between Vehicle 1 and 2, the histogram for Vehicle 1 is different from that of Vehicle 2. For example, possibly due to weather conditions (rainy or not), it is likely for the temperature to have a bi-modal distribution.

Figure 13:
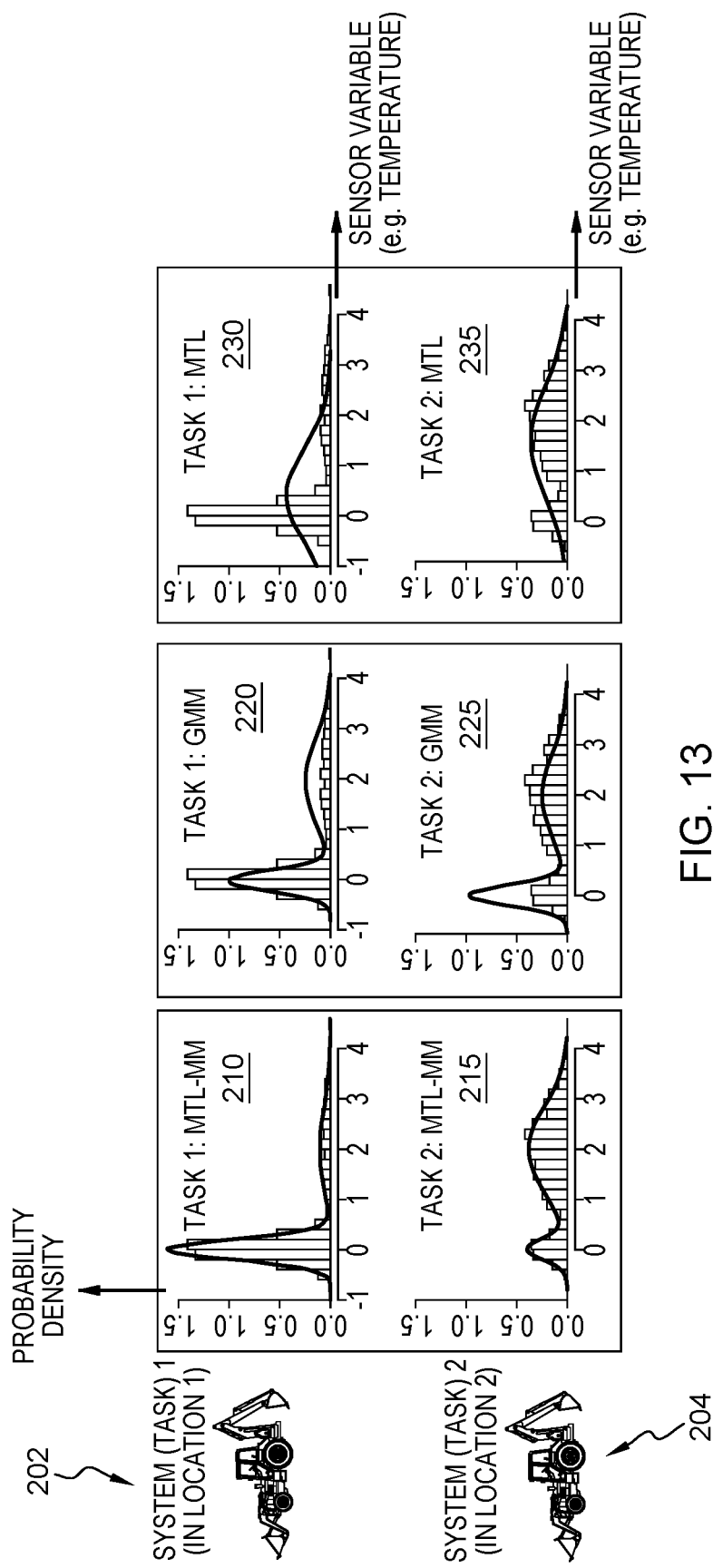
FIG. 13 shows an example graphical depiction of multi-modal distributions with task-dependence and compares a typical result of the invention with known methods.

To fit the empirical distribution, FIG. 13 compares three different model approaches: multi-task and multi-modal (MTL-MM) as described herein, non-MTL Gaussian mixture (GGM), and single-modal MTL models, corresponding to the respective columns 201, 207 and 211. The curves illustrate typical results of model fitting. As shown in FIG. 13, traditional non-MTL Gaussian mixture models (GGM shown at graphs 220, 225 for respective tasks 1, 2 at column 207) can handle multi-modality but disregards the individuality of the tasks (the two systems must have the same model), and existing GGM-based single-modal MTL models shown at graphs 230, 235 for respective tasks 1, 2 shown at column 211 cannot handle the multi-modality since their goal is to find a single precision matrix on a task-wise basis. Only the MTL-MM captures the multi-modality in a task-dependent fashion as shown as the MTL-MM models at graphs 210, 215 for respective tasks 1, 2 shown at column 201.

The systems and methods herein use a GGM-based MTL model that is capable of handling the multi-modality while taking advantage of task-relatedness such that the modeling is applicable to multivariate systems.

For the initial MTL-MM GGM model learning methods described in FIG. 6, the model builder module receives as input, e.g., from data stored in a database, a training data set $D = D_1 \cup \ldots \cup D^S$, where $D^s$ is the data set for the s-th system or task (the term "task" is used interchangeably with "system"), e.g., data collected from each asset of a fleet being monitored. D is assumed to be collected under the normal conditions of the system's operations. Each $D^s$ is a set of $N^s$ samples as $$D^s = \{x^{s(n)} \in R^M | n = 1, \ldots, N^s\}, \qquad (1)$$

where M>1 and is the dimensionality of the samples (or the number of sensors) which is assumed to be the same across the tasks (assets). Letting S be the total number of tasks and $N = \Sigma_{s=1}^{S} N^s$ be the total number of samples (variables), the superscript "s" represents the sample and task indexes. Vectors are represented with the bold face, e.g. $x^{s(n)} = (s_1^{s(n)}, \ldots, x_i^{s(n)}, \ldots, x_M^{s(n)})^T$, and matrices are represented with the sans serif face, e.g. $\Lambda^k = (\Lambda_{i,j}^k)$. The elements of vectors and matrices are denoted with the subscripts.

The method invokes instructions for generating a mixture model for use in capturing multi-modalities. In the following, each mixture component is indexed by k (and sometimes l), which appears either as the super- or subscript.

During operation, one goal of the anomaly score calculator is to compute an anomaly score for a (set of) new sample(s) observed in an arbitrary task. For a new sample x in the s-th task, the overall anomaly score is defined according to equation 2) as:

$$a^s(x) = -\ln p^s(x|D), \qquad (2)$$

where $p^s(\cdot|D)$ is the predictive distribution of the s-th task, which is to be learned based on the training data D.

In addition to the overall anomaly score, there is defined the variable-wise ("per-variable") anomaly scores using the negative log conditional predictive distribution according to equation 3) as follows:

$$a_i^s(x) = -\ln p^s(x_i|x_{-i}, D), \quad (3)$$

where $a_i^s$ denotes the anomaly score for the i-th variable at the s-th task, and $x_{-i} \equiv (x_1, \ldots, x_{i-1}, x_{i+1}, x_M)^T$. To compute this, the system receives detailed information on the variable dependency. One method for outlier detection are the use of the GGMs 330 which provide a way of computing the predictive conditional distribution. As long as the GGM is used as a basic building block of the model, the conditional distribution is easily obtained via the standard partitioning formula of Gaussians.

In one embodiment, as sensor data of industrial applications are very noisy in general, averaged anomaly scores may be computed over a sliding window. Denoting the window $D_{test}$, the averaged version of the anomaly scores are defined according to equations 4) and 5) as:

$$a^s(D^s_{test}) = -\frac{1}{|D^s_{test}|} \sum_{x^s \in D^s_{test}} \ln p^s(x^s | D), \quad (4)$$

$$a_i^s(D^s_{test}) = -\frac{1}{|D^s_{test}|} \sum_{x^s \in D^s_{test}} \ln p^s(x_i | x^s_{-i}, D), \quad (5)$$

where $|D^s_{test}|$ is the size of the set $D^s_{test}$.

Multi-Task Sparse GGM Mixture

To capture multiple operational states of the systems, the system and methods herein generate and employ a probabilistic Gaussian graphical mixture model exhibiting double sparsity: 1) sparsity in the dependency structure of GGM, and 2) sparsity over the mixture components. With respect to the sparsity in the dependency structure of GGM along with the overall framework, there is derived a Bayesian Gaussian mixture model having K mixture components. First, there is defined the observation model of the s-th task according to equation 6) by:

$$p(x^s | z^s, \mu, \Lambda) \equiv \prod_{k=1}^{K} N(x^s | \mu^k, (\Lambda^k)^{-1})^{z_k^s}, \quad (6)$$

where $\mu$ and $\Lambda$ are collective notations representing $\{\mu^k\}$ and $\{\Lambda^k\}$, respectively. Also, $z^s$ is the indicator variable of cluster assignment. As usual, $z_k^s \in \{0,1\}$ for all s, and $\Sigma_{k=1}^K z_k^s = 1$.

By placing the Gauss-Laplace prior on $(\mu^k, \Lambda^k)$ and the categorical distribution on z, there is obtained equations 7, 8 and 9:

$$p(\mu^k, \Lambda^k) = N(\mu^k | m^0, (\lambda_0 \Lambda^k)^{-1}) \operatorname{Lap}(\Lambda^k | \rho), \quad (7)$$

$$\operatorname{Lap}(\Lambda^k | \rho) \equiv \left(\frac{\rho}{4}\right)^{M^2} \exp\left(-\frac{\rho}{2}\|\Lambda^k\|_1\right), \quad (8)$$

$$p(z^s | \pi^s) = \prod_{k=1}^{K} (\pi_k^s)^{z_k^s} \text{ s.t. } \sum_{k=1}^{K} \pi_k^s = 1, \pi_k^s \geq 0, \quad (9)$$

where $\|\Lambda^k\|_1 = \Sigma_{i,j} |\Lambda_{i,j}^k|$. The parameter $\pi^s$ is determined as a part of the model while $\rho$, $\lambda_0$, $m^0$ are given constants. From these equations, there is computed a complete likelihood according to equation 10 as:

$$P(D, Z, \Lambda, \mu | \pi) \equiv \prod_{k=1}^{K} p(\mu^k, \Lambda^k) \times \prod_{s=1}^{S} \prod_{n=1}^{N^s} p(z^{s(n)} | \pi^s) p(x^{s(n)} | z^{s(n)}, \mu, \Lambda), \quad (10)$$

where $z^{s(n)}$ is the cluster assignment variable for the n-th sample in the s-th task. $\pi$ and Z are collective notations for $\{\pi^s\}$ and $\{z_k^{s(n)}\}$, respectively.

It is noted that $\{\mu^k\}$ and $\{\Lambda^k\}$ are not task-specific and are shared by all the tasks. It is the cluster assignment probability $\pi^s$ that reflects the individuality of the tasks. Thus $\pi^s$ can be used as the signature of the s-th task. This corresponds to the individual sparse weights 321 for an individual asset as shown in FIG. 3.

As one general goal of Bayesian formulations is to find the posterior distributions, the variational Bayes (VB) approach is leveraged to obtain a tractable algorithm. The central assumption of VB is that the posterior distribution has a factorized form. In this case, the categorical distribution for Z and the Gauss-delta distribution for $(\mu, \Lambda)$ are assumed according to equations 11) and 12) respectively:

$$q(Z) = \prod_{s=1}^{S} \prod_{n=1}^{N^s} \prod_{k=1}^{K} (r_k^{s(n)})^{z_k^{s(n)}}, \quad (11)$$

$$q(\mu, \Lambda) = \prod_{k=1}^{K} N(\mu^k | m^k, (\lambda_k \Lambda^k)^{-1}) \delta(\Lambda^k - \Lambda^k), \quad (12)$$

where $\delta(\cdot)$ is Dirac's delta function and $\{r_k^{s(n)}, m^k, \lambda_k, \Lambda^k\}$ are model parameters to be learned. Then the methods combine the VB analysis for $\{Z, \mu, \Lambda\}$ with point estimation for the mixture weight $\pi^s$.

In the VB formulation, the method includes determining the model parameters $\{m^k, \lambda_k, \Lambda^k\}$ so that the Kullback-Leibler (KL) divergence between $q(Z)q(\mu, \Lambda)$ and $P(D, Z, \Lambda, \mu|\pi)$ is minimized. It is well-known that minimization of the KL divergence leads to iterative equations according to equations 13) and 14) as follows:

$$\ln q(Z) = c. + \langle \ln P(D,Z,\Lambda,\mu|\pi) \rangle_{\Lambda,\mu}, \quad (13)$$

$$\ln q(\Lambda,\mu) = c. + \langle \ln P(D,Z,\Lambda,\mu|\pi) \rangle_Z, \quad (14)$$

where c. symbolically represents an unimportant constant, $\langle \cdot \rangle_{\Lambda,\mu}$ is the expectation w.r.t. $q(\mu, \Lambda)$, and $\langle \cdot \rangle_Z$ is the expectation w.r.t. $q(Z)$.

To compute these expectations, there is a need to know the value of $\pi$. In the VB framework, an optimization problem to determine $\pi$ is solved alternately with Eqs. (13) and (14) until a convergence as will be discussed in greater detail hereinbelow.

To find explicit expressions of the VB equations (13) and (14), given $\{m^k, \lambda_k, \Lambda^k\}$ and an initialized $\pi^s$, the first VB equation (13) gives:

$$\ln r_k^{s(n)} \leftarrow \ln\{\pi_k^s N(x^{s(n)} | m^k, (\Lambda^k)^{-1})\} - \frac{M}{2\lambda_k} \quad (15)$$

-continued $$r_k^{s(n)} \leftarrow \frac{r_k^{s(n)}}{\sum_{l=1}^{k} r_l^{s(n)}}. \quad (16)$$

To get the first equation, the methods employed calculates the expectation w.r.t. $\mu^k$ and $\Lambda^k$ using the expression of Eq. (12). The second equation 16) results from the normalization condition $\Sigma_k \pi_k^s = 1$.

To solve the second VB equation (14), the methods are employed to first decompose the posterior as $q(\mu, \Lambda) = q(\mu|\Lambda) q(\Lambda)$. For $q(\mu^k|\Lambda^k)$, by arranging the terms of $\langle \ln P \rangle_Z$ related to $\mu^k$, there is obtained equations 17)-20) as follows:

$$N_k \leftarrow \sum_{s=1}^{S} \sum_{n=1}^{N^s} r_k^{s(n)}, \quad (17)$$

$$\bar{x}^k \leftarrow \frac{1}{N_k} \sum_{s=1}^{S} \sum_{n=1}^{N^s} r_k^{s(n)} x^{s(n)}, \quad (18)$$

$$\lambda_k \leftarrow \lambda_0 + N_k, \quad (19)$$

$$m^k \leftarrow \frac{1}{\lambda_k}(\lambda_0 m^0 + N_k \bar{x}^k), \quad (20)$$

given $\{\Lambda^k, r_k^{s(n)}\}$.

For $q(\Lambda)$, the VB equation does not have an analytic solution, however the mode of $\ln q(\Lambda)$ is found instead by solving an objective function of equation 21) with equations 22), 23) as follows:

$$\Lambda^k \leftarrow \arg\max_{\Lambda^k} \left\{ \ln |\Lambda^k| - Tr(\Lambda^k Q^k) - \frac{\rho}{N_k} \|\Lambda^k\|_1 \right\}, \quad (21)$$

$$\Sigma^k \leftarrow \frac{1}{N_k} \sum_{s=1}^{S} \sum_{n=1}^{N^s} r_k^{s(n)} x^{s(n)} x^{s(n)T} - \bar{x}^k (\bar{x}^k)^T \quad (22)$$

$$Q^k \leftarrow \Sigma^k + \frac{\lambda_0}{\lambda_k}(\bar{x}^k - m^0)(\bar{x}^k - m^0)^T. \quad (23)$$

The objective function in equation (21) is convex meaning that the posterior $q(\Lambda)$ is guaranteed to be unimodal, and approximating $q(\Lambda)$ by the delta function is reasonable.

As stated earlier, the VB iterative equations (15)-(23) are combined with point-estimation of $\pi^s$ and details of the approach are now described.

Sparse Mixture Weight Selection

There is now described a formulation to find a sparse solution for $\{\pi^s\}$. While, in the conventional approach, normally referred to as Automatic Relevance Determination (ARD), $\pi$ is determined by maximizing $\langle \ln P(D, Z, \Lambda, \mu|\pi) \rangle_{\Lambda,\mu,Z}$ under the normalization condition, with Eqs. (9) and (10), there is had:

$$\langle \ln P(D, Z, \Lambda, \mu | \pi^s) \rangle_{\Lambda,\mu,Z} = c. + \sum_{n=1}^{N^s} \sum_{k=1}^{K} \langle z_k^{n(s)} \rangle_Z \ln \pi_k^s$$

as a function of $\pi^s$. The expectation is computed using equation (11) as $\langle z_k^{s(n)} \rangle_Z = r_k^{s(n)}$. Thus the optimization problem to be solved reads as:

$$\max_{\pi^s} \sum_{k=1}^{K} c_k^s \ln \pi_k^s \text{ s.t. } \sum_{k=1}^{K} \pi_k^s = 1, \quad (24)$$

where $c_k^s$ is defined as:

$$c_k^s \equiv \frac{1}{N^s} \sum_{n=1}^{N^s} r_k^{s(n)} \quad (25)$$

so $\Sigma_{k=1}^{L} c_k^s = 1$ holds. By introducing a Lagrange multiplier for the constraint $$\sum_{k=1}^{K} \pi_k^s = 1,$$

the optimal solution $\pi^{s*}$ is given by $$\pi_k^{s*} = c_k^s. \quad (26)$$

When combined with a small threshold value below which $\pi_k^s$ is regarded as zero, the problem as set forth in equation (24) often gives a sparse solution, which is sometimes referred to as an instance of the automatic relevance determination (ARD). However, $\pi_k^s$ cannot be mathematically zero because of the logarithm function.

Thus, the sparsity is governed by the heuristically provided numerical threshold and the convergence of the VB algorithm. In the multi-task anomaly detection scenario since it is needed to manage $S$ different anomaly detection models at once, the method implements a formulation for sparse mixture weight selection:

Convex Mixed-Integer Programming Approach

To achieve sparsity in a mathematically well-defined fashion in equation (24), first, the method includes imposing regularization on $\pi^s$. Similarly to the Laplace prior on $\Lambda^k$, it is formally assume that $\pi^s$ has a prior in the form of $p(\pi^s):\exp(-\tau\|\pi^s\|_0/N^s)$, where $\|\pi^s\|_0$ denotes the $\ell_0$-norm (the number of nonzeros), and $\tau > 0$ is a constant assumed to be given.

The optimization problem becomes:

$$\max_{\pi^s} \left\{ \sum_{k=1}^{K} c_k^s \ln \pi_k^s - \tau\|\pi^s\|_0 \right\} \text{ s.t. } \sum_{k=1}^{K} \pi_k^s = 1. \quad (27)$$

The solution (26) is recovered when $\tau = 0$. The $\ell_1$ norm cannot be used here because of the constraint $$\sum_{k=1}^{K} \pi_k^s = 1.$$

Second, the notion of $\varepsilon$-sparsity is formally defined:

Definition 1: For a given small $\varepsilon$, a vector x is called an $\varepsilon$-sparse solution if many elements satisfy $|x_i| \leq \varepsilon$.

Third and finally, methods include modifying the problem (27) into a convex mixed-integer programming (MIP) to get an $\varepsilon$-sparse solution:

$$\max_{\pi^s, y^s} \sum_{k=1}^{K} \{c_k^s \ln \pi_k^s - \tau y_k^s\} \text{ s.t. } \sum_{k=1}^{K} \pi_k^s = 1, \quad (28)$$

$$y_k^s \geq \pi_k^s - \varepsilon, y_k^s \in \{0, 1\} \text{ for } k = 1, \ldots, K,$$

where $0 < \varepsilon = 1$ is another constant controlling the sparsity. $y^s$ plays a role of indicator variable of $\pi^s$. Notice that the inequality constraint $y_k^s \geq \pi_k^s - \varepsilon$ grantees that $y_k^s = 1$ when $\pi_k^s > \varepsilon$ and $y_k^s = 0$ when $\pi_k^s \leq \varepsilon$. The latter follows from the fact that $y_k^s = 1$ gives a smaller objective value and can be ignored when seeking an optimal solution. Thus $P\pi^s P_0$ is equal to $\Sigma_{k=1}^{K} y_k^s$.

The problem (28) is convex. By directly calculating the second derivative w.r.t. $\pi^s$ and $y^s$, it is seen that the Hessian is a 2K×2K diagonal matrix whose diagonal element is either $-c_k^s/(\pi_k^s)^2$ (k=1, ..., K) or 0. Since $c_k^s > 0$, the Hessian is negative semi-definite. Also, all decision variables are bounded in [0,1], and every constraint is linear. Thus the problem (28) is a convex mixed-integer programming with a bounded polyhedron feasible set.

Since $\varepsilon$ is just an explicit representation of the threshold value that has been used heuristically and the objective function is dominated by the first term when $\tau \geq 0$ is small, the problem (28) is a mathematically well-defined surrogate of the original (24).

Thus, in summary, Theorem 1 is a Convex MIP mixture weight selection. The problem (28) is a convex mixed-integer programming with a bounded polyhedron feasible set. The problem (28) generates an $\varepsilon$-sparse solution for a suitable selection of $\tau$. There exist small enough positive numbers $\tau$ and $\varepsilon$ such that (26) is a solution of (28).

An efficient algorithm for solving the MIP is derived for the problem equation (28) represents. First, the method includes finding a solution of equation (28) for each value of $\Sigma_k y_k^s$, and pick the best one from them. Here, K is on the order of 10 in most CbM scenarios, but more or less may be picked.

In this approach, it is assumed that $\{c_k^s\}$ have been sorted in increasing order, $c_1^s \leq \ldots \leq c_K^s$. Since the objective is symmetric w.r.t. k, in order to remove duplicated solutions, it is also assumed $\pi_i^s \leq \pi_j^s$, when $c_i^s = c_j^s$ and i<j. In that case, since a maximization problem is being solved, for a given $K_0 \equiv K - \Sigma_k y_k^s$, then:

$$y_1^s = \ldots = y_{K_0}^s = 0, y_{K_0+1}^s = \ldots = y_K^s = 1 \quad (29)$$

because this choice keeps as many larger $c_k^s$'s as possible. Based on this, $y^s$ is eliminated from (28) to define a $K_0$-specific problem:

$$\max_{\pi^s} \sum_{k=1}^{K} c_k^s \ln \pi_k^s \text{ s.t. } \sum_{k=1}^{K} \pi_k^s = 1, \quad (30)$$

$$\pi_k^s \leq \varepsilon \text{ for } k = 1, \ldots, K_0.$$

To find the optimality condition, the Lagrange function is defined as:

$$L(\pi^s, \alpha^s, \eta^s) \equiv \sum_{k=1}^{K} c_k^s \ln \pi_k^s - \eta^s \sum_{k=1}^{K} \pi_k^s - \sum_{k=1}^{K_0} \alpha_k^s (\varepsilon - \pi_k^s),$$

where $\{\alpha_k^s\}$ and $\eta^s$ are Lagrange's multipliers. By differentiating L w.r.t. $\pi^s$, the Karush-Kuhn-Tucker (KKT) conditions for the problem (30) are:

$$\frac{c_k^s}{\pi_k^s} = \begin{cases} \eta^s + \alpha_k^s, & k \leq K_0 \\ \eta^s, & k > K_0, \end{cases} \quad (31)$$

$$\alpha_k^s(\varepsilon - \pi_k^s) = 0, \alpha_k^s \geq 0 \text{ for } k \leq K_0. \quad (32)$$

This leads to the solution for the assumed $K_0$:

$$\pi_k^{s*}(K_0) = \begin{cases} \varepsilon, & k \leq K_0, c_k^s \geq \varepsilon \eta^s, \\ \dfrac{c_k^s}{\eta^s}, & \text{otherwise,} \end{cases} \quad (33)$$

where the condition $c_k^s \geq \varepsilon \eta^s$ comes from $\alpha_k^s \geq 0$. The multiplier $\eta^s$ is determined so $\Sigma_{k=1}^{K} \pi_k^s = 1$. It is easy to verify that Eq. (33) satisfies the KKT conditions.

The solution $\pi_k^{s*}(K_0)$ is computed for different $K_0$'s, and involves picking the one which gives the maximum objective value of Eq. (28) (not (30)). The computational cost to find the solution is on the order of $K^2$ in the worst case.

Using a convex MIP solver technique at a computer, a system of equations (15)-(23) and (28) are iteratively computed for all the components k and the tasks s until convergence. Notice that the equation for $\Lambda^k$ preserves the original $\ell_1$-regularized GGM formulation. It is seen that the fewer samples a cluster have, the more the $\ell_1$ regularization is applied due to the $\rho/N^k$ term.

Trusting samples assigned to minor clusters involves using, e.g., the graphical lasso algorithm. Once all the model parameters are found, with $$A^k \equiv \frac{\lambda_k}{1 + \lambda_k} \Lambda^k$$

the predictive distribution is given according to:

$$p^s(x^s | D) = \sum_{k=1}^{K} \pi_k^s \int d\mu^k \int d\Lambda^k \ N(x^s | \mu^k, (\Lambda^k)^{-1}) q(\mu^k, \Lambda^k), \quad (34)$$

$$= \sum_{k=1}^{K} \pi_k^s N(x^s | m^k, (A^k)^{-1}).$$

FIG. 7 shows a detailed MTL-MM GGM algorithm 700 used for solving the convex MIP problem for automatically learning the anomaly detection model for an asset (system). As shown, the processing iterates over a loop 750 to iteratively solve the system of equations (15)-(23) and (28) until a convergence condition is achieved, at which time the algorithm outputs the sparse mixture weight solution set $\pi_k^s$ at 745 for the system and updated sparse GGM set dictionary for all assets.

Figure 8:
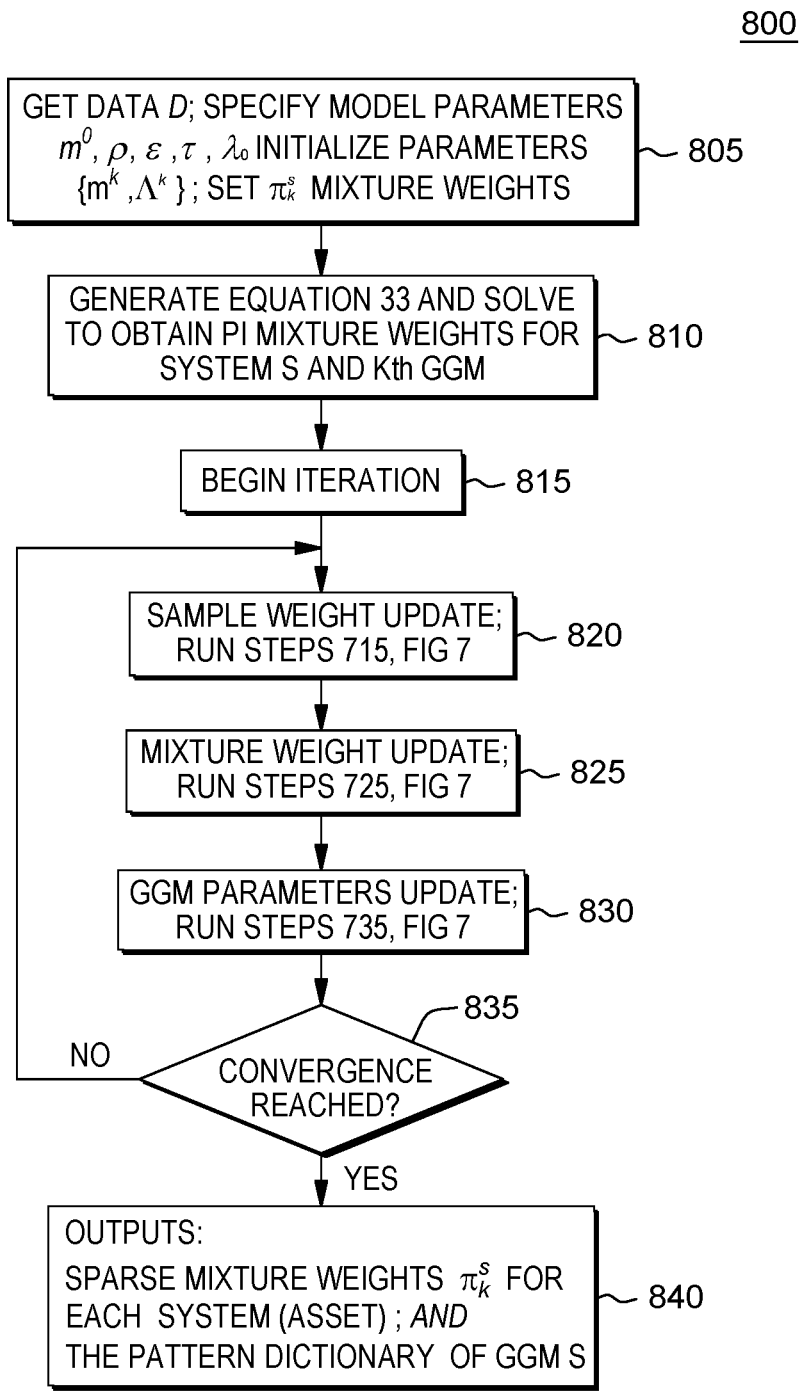
FIG. 8 is a method 800 for automatically learning the anomaly detection model for an asset (system) in one embodiment.

FIG. 8 is a method 800 for automatically learning the anomaly detection model for an asset (system). A first step 805 depicts an initialization step wherein the multivariate time-series data D is received as input and prepared from the S systems, e.g., under (mostly) normal conditions.

For the MTL-MM algorithm initialization step 805 further includes initializing $\{m^k, \Lambda^k\}$, in the context of industrial CbM.

Figure 12:
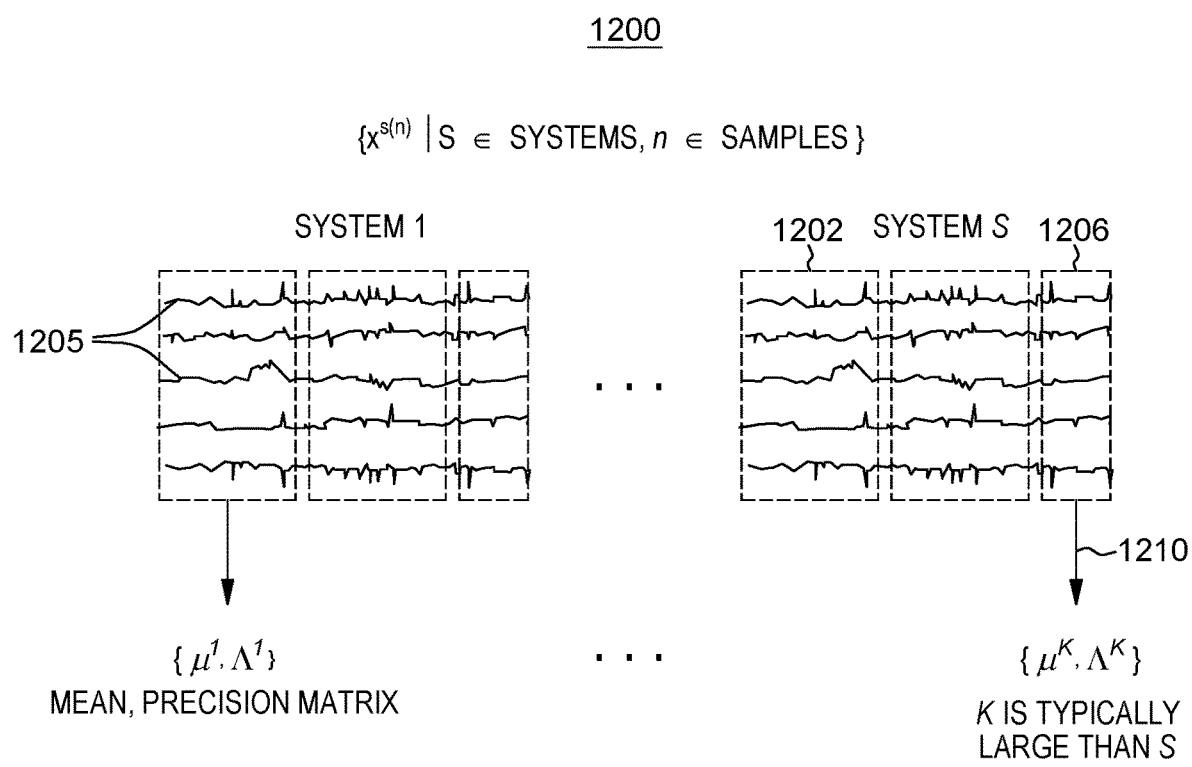
FIG. 12 shows an approach for the partitioning of multivariate time-series data for multiple systems in one embodiment.

For generating the mixture model, one approach is to disjointly partition each data along the time axis as $D^s = D_1^s \cup D_2^s \ldots$ where D is data for a particular system s. FIG. 12 shows an approach for the partitioning of multivariate time-series data 1200 for multiple systems each system being split into three blocks or sub-sets 1202-1206 with each line 1205 of a block corresponding to $i^{th}$ sensor variables, e.g., engine RPM, acceleration, pressure, etc., for example. Once split, a method is invoked to apply a graphical lasso algorithm on each split block 1202-1206. This is performed for each partition in each system to learn a single-modal GGM model for each block and generate an initial (mean vector $\{\mu^k\}$, and precision matrix $\{\Lambda^k\}$) for the sub-sets for the $k^{th}$ pattern of a palette. For data sets of independent, identically distributed (i.i.d.) samples (variables), on the other hand, k-means clustering can be used to $\{\mu^k\}$, followed by graphical lasso for $\{\Lambda^k\}$. These initial values of mean vector, precision matrix for a partition are referred to as seeds. In one embodiment, there is no need to know the precise number of K (i.e., total number of seeds) in advance. The initial number of mixture components K should be large enough to be able to automatically find an optimal number of non-empty clusters, K'<K.

Figure 9:
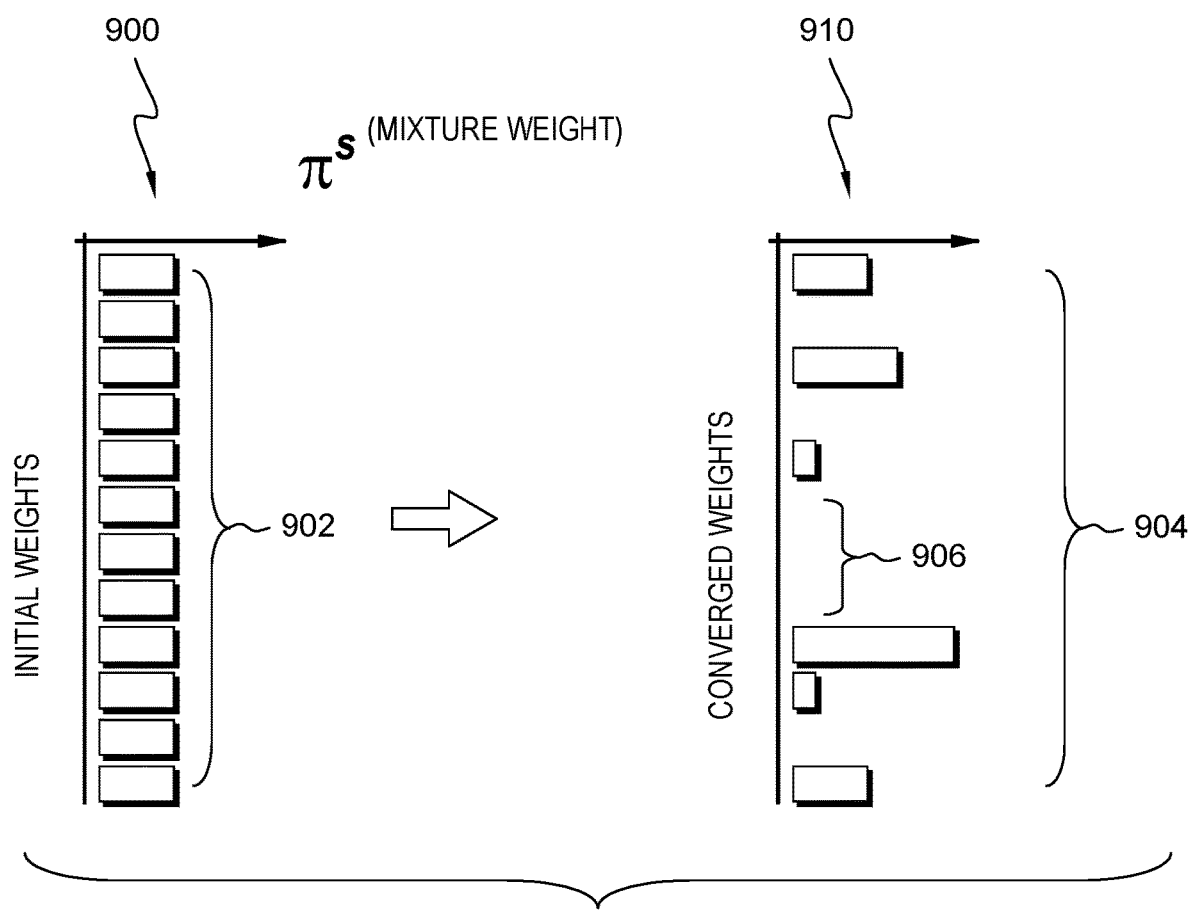
FIG. 9 is an example depiction of initialized mixture weight settings and converged mixture weight values after running the learned anomaly detection model.

Additionally received are the data sets from the assets are MTL-MM data D, specify model parameters $m^0$, $\rho$, $\epsilon$, $\tau$, $\lambda_0$ and additionally set are the mixture weights for the $s^{th}$ system and $k^{th}$ GGM. FIG. 9 depicts an example initial mixture weight setting 900 for a system s with all the weights initially set with a value 902 computed as:

$$\pi_k^s = \frac{1}{K}$$

for all k, s where s←1, S and k←1, K. Further variables having initialized value include setting $$\lambda_k = \lambda_0 + \frac{N}{K}$$

for all k, s where s←1, S n←1, $N^s$ k←1, K. For standardized data, $\lambda_0 = 1$ and $m^0 = 0$ are a reasonable choice. For the MIP parameters, $\tau$ can be a value in (0,1] such as 0.1. Since $\epsilon$ has the meaning of minimum resolution of mixture weight (the probability to find a sample in the cluster), in one embodiment, a value such as $10^{-5}$ could be used. Virtually the only parameter to be determined via cross-validation is $\rho$, as $\rho$ controls the sparsity of the GGM. In the context of anomaly detection, $\rho$ is determined so a performance metric such as the AUC (area-under-curve) and the F-measure is maximized. At step 810 then, the method solves equation 33) using a semi-closed form convex MIP solution to compute a sparse mixture weight solution $\pi_k^{s*}(K_0)$ for different $K_0$'s. This includes, beginning an iterative process (loop) at 815 that runs steps 820-830 until a convergance condition is achieved. In FIG. 8, step 820 of the iterative loop inokes instructions for performing the sample weight update which includes running steps 715 of the Algorithm 700 of FIG. 7 to solve equation (15) and generate the $r_k^{s(n)}$ where the $r_k^{s(n)} \leftarrow r_k^{s(n)}/\Sigma_{l=1}^K r_l^{s(n)}$ for k←1, K s←1, S. At further step 825 of the iterative loop, instructions are run for performing the mixture weight update which includes running steps 725 of the Algorithm 700 of FIG. 7 to solve equation (28) and generate the mixture weights $\pi_k^s$. Further, at step 830 of the iterative loop, instructions are run for performing the mixture weight update which includes running steps 735 of the Algorithm 700 of FIG. 7 to generate output $N_k \leftarrow \Sigma_{s=1}^S \Sigma_{n=1}^{N^s} r_k^{s(n)}$ $\lambda_k \leftarrow \lambda_0 + N_k$ and the $m^k$ by solving Equations (17)-(20). The $\Lambda^k$ are further generated by solving equation (21). Returning to FIG. 8, a determination is made as to whether a convergence condition has occurred. If no convergence condition is detected, the method returns to step 820 to perform further iterations of steps 820-830. Upon achieving a convergence at 335, the method generates the outputs sparse mixture weight output $\{\pi^s\}$ for the system (asset) S where s←1, S (a vector of different metric weights for different assets), and outputs the pattern dictionary $\{\mu^k, \Lambda^k, \lambda_k\}$ including GGM number lambda number, and for the GGM palette where $\mu^k$ is mean value of the Gaussian distribution and the matrix $\Lambda^k$ provide the GGM values used to sparsely populate the GGM palette (e.g., K GGM graphs or patterns in the dictionary where k←1, K).

FIG. 9 further depicts the resulting converged sparse weight distribution 904 for system s resulting from the iterating procedure that solves equation (28). As shown in the example, the method optimally achieves a sparse mixture solution 910 having determined many components 906 as irrelevant and as a consequence truncated.

Figure 10:
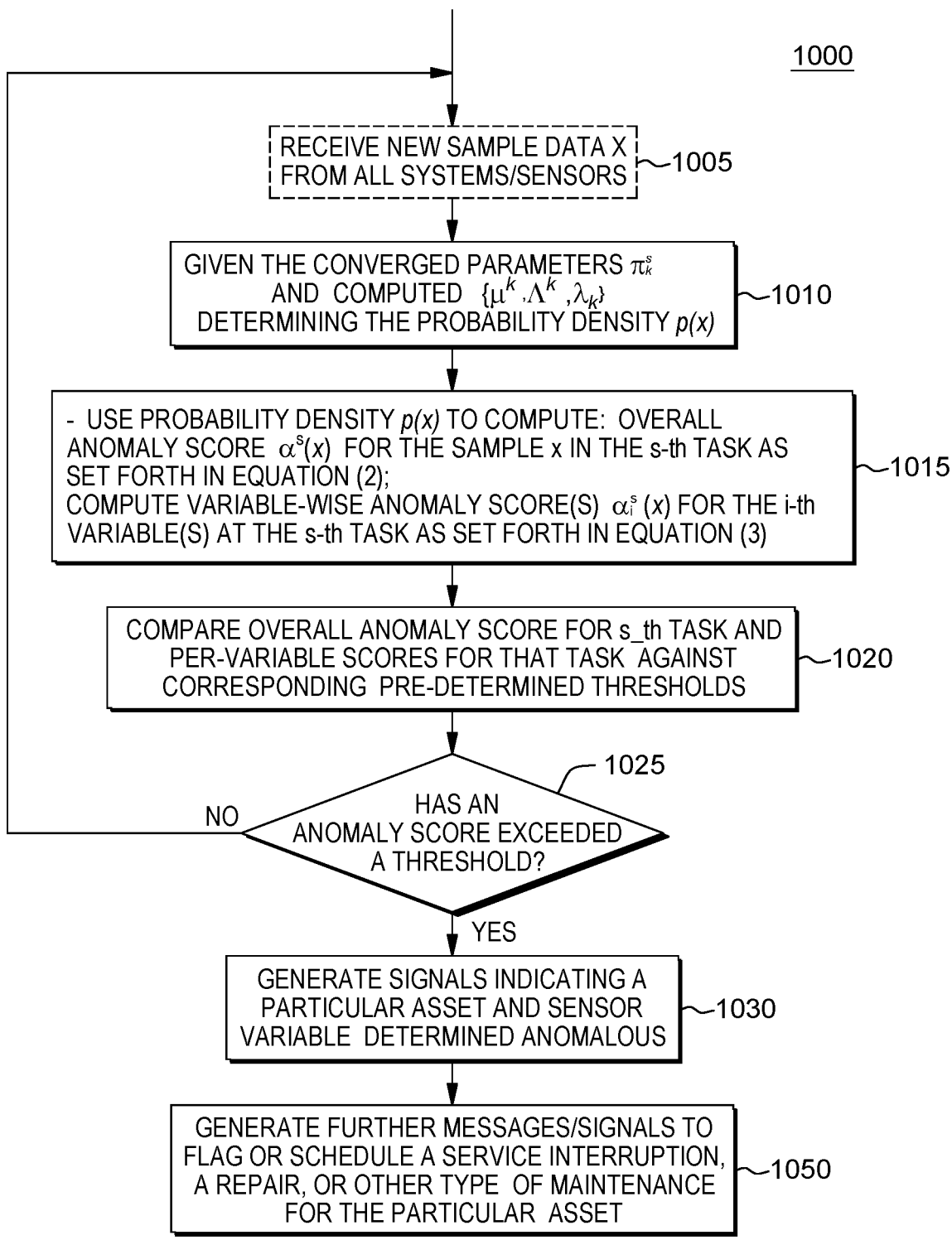
FIG. 10 depicts a high level method for anomaly detection operations in one embodiment.

FIG. 10 depicts a high level method 1000 for anomaly detection operations. As shown, at 1005 there is received at a computer system new sample data collected from sensors at each of the assets for a present time window. The receipt and collection of sensor variable (multivariate) data may occur in real time, near real time, or periodically, e.g., every day, or every month. The learned model uses existing converged parameters in the model to compute, at 1010, a probability function as a function of the new sample data x. Then, at 1015, the overall anomaly score $a^s(x)$ is computed for the sample x in the s-th task as set forth in equation (2).

In one embodiment, $a^s(x)$ may be computed according to the following function:

$$a^s(x) = -\log\left\{\sum_{k=1}^K \pi_k^s \mathcal{N}(x \mid m^k, (A^k)^{-1})\right\},$$

where $A^k \equiv \frac{\lambda_k}{1+\lambda_k}\bar{\Lambda}^k$.

Then, at 1015, the method computes the per-variable anomaly score $a_i^s(x)$ for the $i^{th}$ sensor of the s-th task. In one embodiment, $a_i^s(x)$ may be computed according to the following function:

$$a_i^s(x) = -\log\left\{\sum_{k=1}^K \pi_k^s \mathcal{N}(x_i \mid u_i^k(x_{-i}), (A_{i,i}^k)^{-1})\right\},$$

where $$u_i^k(x_{-i}) \equiv m_i^k - \frac{1}{A_{i,i}^k}\sum_{l \neq i}^M A_{i,l}^k(x_l - m_l^k)$$

Continuing, at 1020, a comparison is made, e.g., at the anomalous detection coordinator, comparing the computed overall anomaly score $a^s(x)$ for the new sample against a pre-determined threshold value representative of the overall system (e.g., derived from historical anomalous values). Further, coordinator compares the computed variable-wise anomaly score $a_i^s(x)$ for the new sample against a corresponding pre-determined threshold, e.g., based on a quantile value for that variable. If the i-th score $a_i^s(x)$ for the new sample x exceeds a pre-determined threshold value, it is assumed that a part related to the i-th variable has a problem. At 1025, based on the comparisons, the coordinator determines whether an anomaly score has exceeded a corresponding threshold value. If no anomaly score has been to exceed a threshold, then it is assumed all the parts of all vehicles are operating under normal conditions and the model may be updated with the new data and/or the method returns to step 1005 to wait to receive new multivariate data samples. If at 1025, it is determined that one or more anomaly scores are greater than their corresponding thresholds, this may indicate a possible malfunction with some of the parts of that asset and at 1030, FIG. 10, the system generates signals (signals 145 of FIG. 1) indicating those assets and corresponding overall and/or variable-wise anomalous scores. These signals are automatically communicated directly or via a network connection to a Maintenance Planner module 160, which runs instructions for prioritizing maintenance actions. The maintenance planner 160 from the data represented in the signals may accordingly determine a need for instructing or flagging a service interruption for repairing that particular potentially troublesome parts of the assets (systems), depending on the severity and resource availability. For example, a new part or component or sensor may have to be replaced in that particular asset to address an issue as determined by that variable's per-variable anomaly score. In one embodiment, at 1050, FIG. 10, the planner module may automatically generate further signals embodying messages to flag or schedule a service interruption, repair, or other type of maintenance for the potentially anomalous asset.

Figure 11:
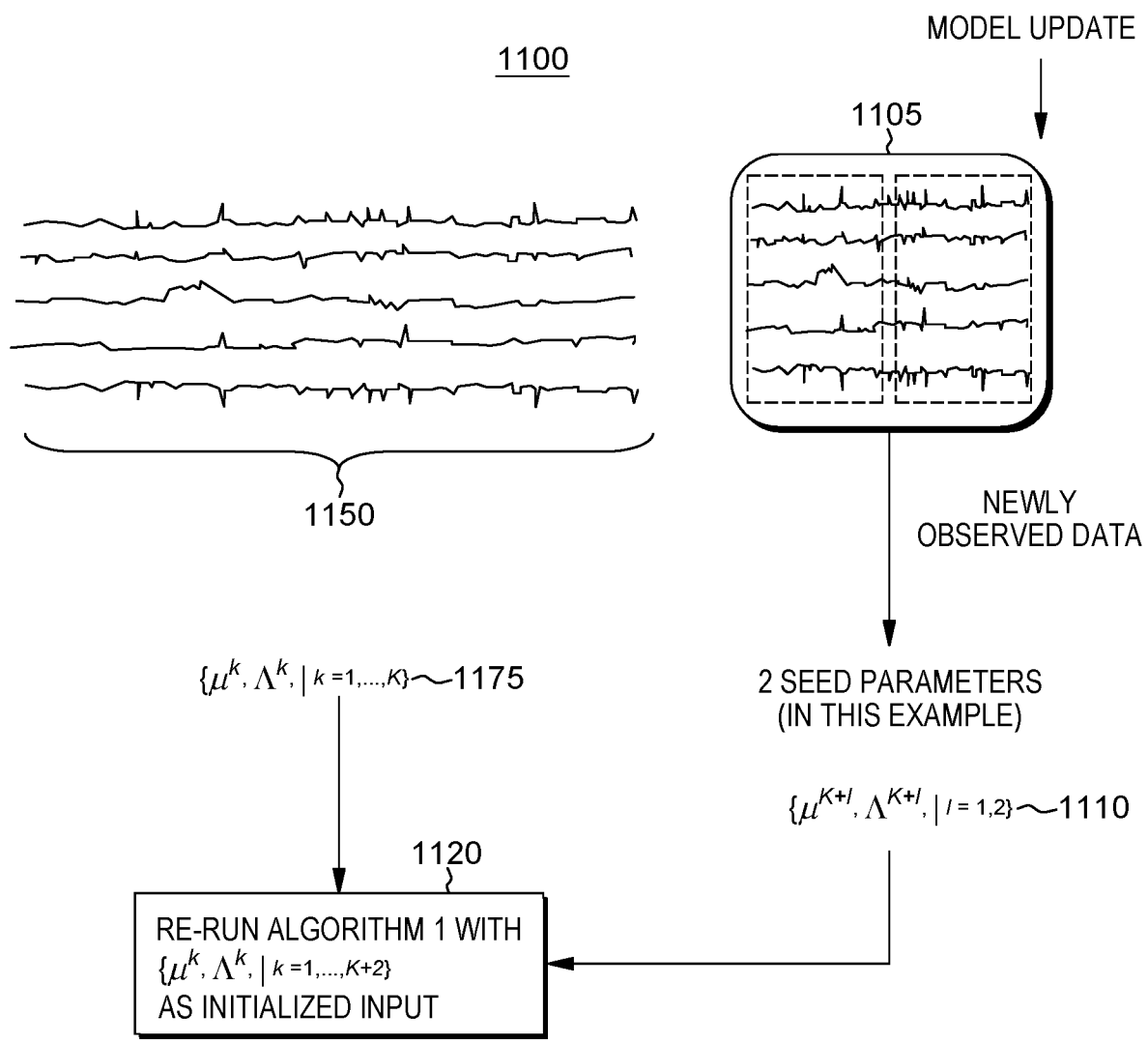
FIG. 11 describes a model re-learning method for updating of the model according to the latest data without explicitly referring to the previous training data in one embodiment.

FIG. 11 describes a model update method 1100, i.e., a re-learning, i.e., updating of the model according to the latest data without explicitly referring to the previous training data. FIG. 11 represents, in one embodiment, a "hot start" approach using already learned model parameters for running the newly acquired data in the model. At 1105, there is depicted the receipt of new sample data, e.g., recently observed new data from a system. This data may be partitioned to obtain seed data based on the partitioning scheme at the initialization of the mixture model. In the example shown in FIG. 11, there is shown data split into two blocks thus creating corresponding number (e.g., two) seed parameters 1110. For example, these see seed parameters include $\{\mu^{k+l}, \Lambda^{k+l}\}$, where l=1, 2. Continuing in FIG. 11, at 1120, the Algorithm 700 of FIG. 7 is run with initialized input for mean vector and precision matrix depicted as $\{\mu^k, \Lambda^k\}$ with k=1, 2, . . . , K+2. It is understood that the initial $\{\mu^k, \Lambda^k\}$ values with k=1, 2, . . . , K 1175 that are input to the Algorithm 700 for learning the mixture model include those already learned K (nonzero) components 1150. Thus, in view of FIG. 11, in an on-line mode of operation, Model Builder may periodically update the models according to the latest data without explicitly referring to the previous training data. To do this, Model Builder receives the latest data within a predetermined size of the window. For example, it can use the present week's data. Then it produces one or a few "seed" patterns, in the same way to initialize the patterns in the batch mode, resulting in a set of the mean vector and the precision matrix of sparse GGM. Model Builder uses the seed patterns together with the already learned patterns to run the batch-mode procedure of Model Builder.

Thus, in one aspect, the present system and methods develop an interpretable fleet-level model that can handle multi-modality and heavy noise. The data-driven anomaly detection model using input sensor data (e.g., real-valued multivariate time-series) and generate an output anomaly or change score for each sensor is multivariate and provides an efficient approach for managing fleets of assets. Example usages may include but are not limited to: managing hundred of similar type of assets (e.g., machines or vehicles) under different operating conditions, and managing and monitoring of thousands of assets in certain areas for asset health monitoring. In an example application, the methods herein may be employed in the domain of semiconductor manufacturing as the model can provide a maintenance service for hundreds of etching tools being managed.

The model further may be used as practical requirements in Internet-of-Things (IoT)-related industries or any industry by capturing both individuality and commonality including automatically capturing multiple operational states without specifying, e.g., a number of patterns, and that is robust to noise and be highly interpretable for diagnosis purposes.

FIG. 14 illustrates an example computing system in accordance with the present invention that may provide the services and functions associated with the condition-based monitoring (CbM) of a fleet of assets. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules 10 may include routines, programs, objects, components, logic, data structures, and so on that perform particular tasks and/or implement particular input data and/or data types in accordance with the methods described herein with respect to FIGS. 1-13.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for anomaly detection when collectively monitoring a fleet of assets, the method comprising:
   receiving, using said one or more hardware processors, multivariate time-series data from plural sensors associated with each asset of a fleet of assets, the data representing multiple operational states associated with similar assets at a present time window;
   determining, using one or more said hardware processors, current parameter values of a learned mixture model based on said received present time window data, said mixture model capturing both a dependency structure of the similar assets of the fleet and data representing an individual asset's mixture model weight signature, said learned mixture model being a doubly sparse multitask, multimodal Gaussian graphical mixture model (MTL-MM GGM) representing both an individuality and commonality of each of the assets in the fleet;
   computing, using said one or more hardware processors, an anomalous condition value based on said determined parameter values;
   comparing, using said one or more hardware processors, said anomalous condition value against a threshold value;
   responsive to said comparison, using said one or more hardware processors to detect an anomalous condition with respect to one or more assets; and
   automatically generating, using said one or more hardware processors, a notification of said detected anomalous condition for communication to a user via an interface device.

2. The method according to claim 1, wherein said determining parameter values comprises:
   for each said similar asset of said fleet,
   solving, using said one or more hardware processors, said MTL-MM GGM using said present time window multi-operational states asset data, said solving comprising:
   updating a basis set of sparse Gaussian mixture models (GGMs), each GGM representing said dependency structure of the similar assets; and
   updating a set of individual sparse mixture weights representing said asset's individual mixture model weight signature.

3. The method according to claim 2, wherein said updating said basis set of sparse GGMs and updating said set of individual sparse mixture weights does not require storage or use of prior obtained multivariate training data used for learning said model.

4. The method according to claim 2, wherein said solving, using said one or more hardware processors, said MTL-MM GGM comprises:
   generating, using said one or more hardware processors, a variational Bayes algorithm having a guaranteed sparsity in both variable dependency relationships and mixture weights, said generating implementing an $\ell_0$-regularized formulation for determining said mixture weights.

5. The method according to claim 1, wherein said computing an anomalous condition value based on said determined parameter values comprises:
   generating, an overall anomaly score for the particular system, said comparing comprising: comparing said overall anomaly score against a threshold value.

6. The method according to claim 5, wherein said computing an anomalous condition value based on said determined parameter values comprises:

generating, multiple per-variable scores, each per-variable anomaly score corresponding to each variable generating sensor of the particular system, said comparing further comprising: comparing each per-variable anomaly score against a respective corresponding threshold value, said anomalous condition being detected for an particular asset and a particular component of said asset having a sensor variable contributing to said anomalous score.

7. The method according to claim 6, wherein said automatically generating, using said one or more hardware processors, a notification of said anomalous condition further comprises:
generating one or more signals representing a detected asset having an anomalous score and a particular variable of said asset exhibiting said anomalous score;
communicating, using said one or more hardware processors, said one or more signals for receipt at a maintenance scheduler device; and
scheduling, at said maintenance scheduler device, a time for servicing said asset or component within said asset having said anomalous score.

8. The method according to claim 6, further comprising:
prioritizing, using said one or more hardware processors, a time to schedule an asset or component of an asset for said servicing.

9. A system for collectively monitoring a fleet of assets comprising:
a hardware processor and a non-transitory computer-readable memory coupled to the processor, wherein the memory comprises instructions which, when executed by the processor, cause the processor to:
receive multivariate time-series data from plural sensors associated with each asset of a fleet of assets, the data representing multiple operational states associated with similar assets at a present time window;
determine current parameter values of a learned mixture model based on said received present time window data, said mixture model capturing both a dependency structure of the similar assets of the fleet and data representing an individual asset's mixture model weight signature, said learned mixture model being a doubly sparse multi-task, multimodal Gaussian graphical mixture model (MTL-MM GGM) representing both an individuality and commonality of each of the assets in the fleet;
compute an anomalous condition value based on said determined parameter values;
compare said anomalous condition value against a threshold value;
responsive to said comparison, detect an anomalous condition with respect to one or more assets; and
automatically generate a notification of said detected anomalous condition for communication to a user via an interface device.

10. The system according to claim 9, wherein to determine said parameter values, said hardware processor is further configured to:
for each said similar asset of said fleet,
solve said MTL-MM GGM using said present time window multi-operational states asset data, said solving comprising:
updating a basis set of sparse Gaussian mixture models (GGMs), each GGM representing said dependency structure of the similar assets; and
updating a set of individual sparse mixture weights representing said asset's individual mixture model weight signature.

11. The system according to claim 10, wherein said updating said basis set of sparse GGMs and updating said set of individual sparse mixture weights does not require storage or use of prior obtained multivariate training data used for learning said model.

12. The system according to claim 10, wherein to solve said MTL-MM GGM, said hardware processor is further configured to:
generate a variational Bayes algorithm having a guaranteed sparsity in both variable dependency relationships and mixture weights, said generating implementing an $\ell_0$-regularized formulation for determining said mixture weights.

13. The system according to claim 10, wherein to compute said anomalous condition value based on said determined parameter values, said hardware processor is further configured to:
generate an overall anomaly score for the particular system; and
generate multiple per-variable scores, each per-variable anomaly score corresponding to each variable generating sensor of the particular system, said comparing further comprising:
comparing said overall anomaly score against a threshold value; and
comparing each per-variable anomaly score against a respective corresponding threshold value,
said anomalous condition being detected for an particular asset and a particular component of said asset having a sensor variable contributing to said anomalous score.

14. The system according to claim 13, wherein to automatically generate a notification of said anomalous condition, said hardware processor is configured to:
generate one or more signals representing a detected asset having an anomalous score and a particular variable of said asset exhibiting said anomalous score;
communicate said one or more signals for receipt at a maintenance scheduler device; and
schedule at said maintenance scheduler device, a time for servicing said asset or component within said asset having said anomalous score.

15. A computer program product comprising a non-transitory computer-readable storage medium having a computer-readable instructions stored therein, wherein the computer-readable instructions, when executed on a computer system comprising at least one hardware processor, causes the hardware processor to:
receive multivariate time-series data from plural sensors associated with each asset of a fleet of assets, the data representing multiple operational states associated with similar assets at a present time window;
determine current parameter values of a learned mixture model based on said received present time window data, said mixture model capturing both a dependency structure of the similar assets of the fleet and data representing an individual asset's mixture model weight signature, said learned mixture model being a doubly sparse multi-task, multimodal Gaussian graphical mixture model (MTL-MM GGM) representing both an individuality and commonality of each of the assets in the fleet;
compute an anomalous condition value based on said determined parameter values;

compare said anomalous condition value against a threshold value;
responsive to said comparison, detect an anomalous condition with respect to one or more assets; and
automatically generate a notification of said detected anomalous condition for communication to a user via an interface device.

16. The computer program product according to claim 15, wherein to determine said parameter values, said instructions further configure said hardware processor to:
for each said similar asset of said fleet,
solve said MTL-MM GGM using said present time window multi-operational states asset data, said solving comprising:
updating a basis set of sparse Gaussian mixture models (GGMs), each GGM representing said dependency structure of the similar assets; and
updating a set of individual sparse mixture weights representing said asset's individual mixture model weight signature.

17. The computer program product according to claim 16, wherein to solve said MTL-MM GGM, said instructions further configure said hardware processor to:
generate a variational Bayes algorithm having a guaranteed sparsity in both variable dependency relationships and mixture weights, said generating implementing an $\ell_0$-regularized formulation for determining said mixture weights.

18. The computer program product according to claim 16, wherein to compute said anomalous condition value based on said determined parameter values, said instructions further configure said hardware processor to:
generate an overall anomaly score for the particular system; and
generate multiple per-variable scores, each per-variable anomaly score corresponding to each variable generating sensor of the particular system, said comparing further comprising:
comparing said overall anomaly score against a threshold value; and
comparing each per-variable anomaly score against a respective corresponding threshold value,
said anomalous condition being detected for an particular asset and a particular component of said asset having a sensor variable contributing to said anomalous score.

19. The computer program product according to claim 18, wherein to automatically generate a notification of said anomalous condition, said instructions further configure said hardware processor to:
generate one or more signals representing a detected asset having an anomalous score and a particular variable of said asset exhibiting said anomalous score;
communicate said one or more signals for receipt at a maintenance scheduler device; and
schedule at said maintenance scheduler device, a time for servicing said asset or component within said asset having said anomalous score.

* * * * *